US009517556B2

(12) United States Patent
Shiratsuchi

(10) Patent No.: US 9,517,556 B2
(45) Date of Patent: Dec. 13, 2016

(54) ROBOT CONTROL APPARATUS AND ROBOT CONTROL METHOD

(71) Applicant: Mitsubishi Electric Corporation, Chiyoda-ku (JP)

(72) Inventor: Koji Shiratsuchi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 95 days.

(21) Appl. No.: 14/401,593

(22) PCT Filed: May 30, 2013

(86) PCT No.: PCT/JP2013/065060
§ 371 (c)(1),
(2) Date: Nov. 17, 2014

(87) PCT Pub. No.: WO2014/002678
PCT Pub. Date: Jan. 3, 2014

(65) Prior Publication Data
US 2015/0148952 A1 May 28, 2015

(30) Foreign Application Priority Data

Jun. 29, 2012 (JP) ................................ 2012-146947

(51) Int. Cl.
*G05B 19/418* (2006.01)
*B25J 9/00* (2006.01)
(Continued)

(52) U.S. Cl.
CPC ............ *B25J 9/0084* (2013.01); *B25J 9/1682* (2013.01); *G06N 99/005* (2013.01);
(Continued)

(58) Field of Classification Search
CPC ....... B25J 9/1682; B25J 9/1669; B25J 9/1674;
G05B 2219/39139; G05B 19/414; G05B 19/41815; G05B 2219/39105; G05B 2219/39124; G05B 2219/39136; G05B 2219/39141; G05B 2219/39144; G05B 2219/39382
(Continued)

(56) References Cited

U.S. PATENT DOCUMENTS 5,129,044 A * 7/1992 Kashiwagi ............. B25J 9/1633
700/251
5,243,266 A * 9/1993 Kasagami ............. B25J 9/1682
318/568.1
(Continued)

FOREIGN PATENT DOCUMENTS

JP 63-113605 5/1988
JP 06-71580 3/1994
(Continued)

OTHER PUBLICATIONS

Office Action issued on Apr. 7, 2016 in German Patent Application No. 11 2013 003 209.0 with English translation.
(Continued)

*Primary Examiner* — Khoi Tran
*Assistant Examiner* — Jorge Peche
(74) *Attorney, Agent, or Firm* — Oblon, McClelland, Maier & Neustadt, L.L.P.

(57) ABSTRACT

A robot control apparatus includes a transformation-matrix generating unit that generates, on the basis of N first command values for learning per one robot, which are position-corrected command values for positioning a master robot and a slave robot on tracks of their respective robots during the synchronous driving, concerning the respective N command values for learning, transformation matrices among the command values for learning, a command-value storing unit that outputs a first command value for driving at
(Continued)

each of M operation periods for defining the track of the master robot, a transformation-matrix -function generating unit and a command-value generating unit that interpolate the N transformation matrices and generate a transformation matrix at the each first command value for driving, and a command-value generating unit that causes the transformation matrices to act on the M first command values for driving and generates M second command values for driving of the slave robot.

11 Claims, 17 Drawing Sheets

(51) Int. Cl.
*B25J 9/16* (2006.01)
*G06N 99/00* (2010.01)

(52) U.S. Cl.
CPC .............. *G05B 2219/39122* (2013.01); *G05B 2219/39124* (2013.01); *Y10S 901/03* (2013.01)

(58) Field of Classification Search
USPC ............... 701/248, 250, 252, 253, 258, 260, 261,701/262
See application file for complete search history.

(56) References Cited

U.S. PATENT DOCUMENTS

| | | | | |
|---|---|---|---|---|
| 5,353,386 A * | 10/1994 | Kasagami | ............ | B25J 9/1682 700/247 |
| 5,596,683 A * | 1/1997 | Kasagami | ............ | B25J 9/1682 700/248 |
| 5,994,864 A * | 11/1999 | Inoue | ............ | B25J 9/1633 318/568.2 |
| 6,317,653 B1 * | 11/2001 | Kamiya | ............ | B25J 9/1633 318/566 |
| 6,330,493 B1 * | 12/2001 | Takahashi | ............ | B25J 9/1682 700/245 |
| 6,401,011 B1 * | 6/2002 | Hashimukai | ............ | B25J 9/1682 29/430 |
| 6,466,844 B1 * | 10/2002 | Ikeda | ............ | B25J 9/1682 318/565 |
| 8,560,123 B2 | 10/2013 | Choi | | |
| 9,329,593 B2 * | 5/2016 | Izumi | ............ | G05B 19/41815 |
| 2002/0029095 A1 * | 3/2002 | Kosaka | ............ | B25J 9/1674 700/245 |
| 2003/0220715 A1 * | 11/2003 | Kneifel, II | ............ | B25J 9/1682 700/248 |
| 2004/0030453 A1 * | 2/2004 | Graf | ............ | B25J 9/1669 700/245 |
| 2004/0199290 A1 * | 10/2004 | Stoddard | ............ | B25J 9/1669 700/248 |
| 2005/0055132 A1 * | 3/2005 | Matsumoto | ............ | B25J 9/1682 700/245 |
| 2006/0069466 A1 * | 3/2006 | Kato | ............ | B25J 9/1682 700/264 |
| 2006/0145647 A1 * | 7/2006 | Kitatsuji | ............ | B25J 9/1682 318/568.11 |
| 2006/0217841 A1 * | 9/2006 | Matsumoto | ............ | B25J 9/1669 700/248 |
| 2006/0287769 A1 * | 12/2006 | Yanagita | ............ | B25J 9/1669 700/245 |
| 2007/0142966 A1 * | 6/2007 | Mirza | ............ | G05B 19/4142 700/245 |
| 2007/0150093 A1 * | 6/2007 | Nagatsuka | ............ | B25J 9/1682 700/235 |
| 2008/0077279 A1 * | 3/2008 | Kato | ............ | B25J 9/1633 700/261 |
| 2008/0234861 A1 * | 9/2008 | Fortell | ............ | B25J 9/1682 700/245 |
| 2009/0287354 A1 * | 11/2009 | Choi | ............ | B25J 9/1633 700/261 |
| 2010/0286826 A1 * | 11/2010 | Tsusaka | ............ | B25J 9/1633 700/254 |
| 2011/0245971 A1 * | 10/2011 | Sarh | ............ | B25J 9/1682 700/248 |
| 2012/0072019 A1 * | 3/2012 | Sanders | ............ | B25J 9/1682 700/245 |
| 2013/0120547 A1 * | 5/2013 | Linnell | ............ | G06T 13/40 348/61 |
| 2013/0245823 A1 * | 9/2013 | Kimura | ............ | B25J 5/02 700/248 |
| 2014/0277714 A1 * | 9/2014 | Izumi | ............ | B25J 9/0084 700/248 |
| 2014/0277715 A1 * | 9/2014 | Nagai | ............ | B25J 9/0084 700/248 |
| 2015/0177194 A1 * | 6/2015 | Xu | ............ | G01N 29/043 73/641 |
| 2015/0266706 A1 * | 9/2015 | Hashimoto | ............ | B66C 23/04 414/590 |
| 2015/0290798 A1 * | 10/2015 | Iwatake | ............ | B25J 13/085 700/257 |
| 2016/0023355 A1 * | 1/2016 | Komatsu | ............ | B25J 9/1682 700/248 |
| 2016/0089784 A1 * | 3/2016 | Koike | ............ | B23K 9/10 700/250 |

FOREIGN PATENT DOCUMENTS

| | | |
|---|---|---|
| JP | 07-020915 | 1/1995 |
| JP | 07-205072 | 8/1995 |
| JP | 07-256580 | 10/1995 |
| JP | 08-057780 | 3/1996 |
| JP | 09-207088 | 8/1997 |
| JP | 10-083208 | 3/1998 |
| JP | 11-119820 A | 4/1999 |
| JP | 2000-190266 | 7/2000 |
| JP | 2001-216012 | 8/2001 |
| JP | 2002-018752 | 1/2002 |
| JP | 2002-082705 | 3/2002 |
| JP | 2005-262369 | 9/2005 |
| JP | 2006-099474 | 4/2006 |
| JP | 2008-254097 | 10/2008 |
| JP | 2009-018380 | 1/2009 |
| JP | 2009-274203 | 11/2009 |
| JP | 2010-023128 | 2/2010 |
| JP | 2010-082802 | 4/2010 |
| JP | 2011-104740 | 6/2011 |

OTHER PUBLICATIONS

International Search Report issued Sep. 3, 2013, in PCT/JP13/065060, filed May 30, 2013.

Arimoto, S., "Dynamics and Control of Robots", Asakura Publishing Co., Ltd., pp. 182, I.1-187,I.13, Nov. 1, 1990 (with English translation).

* cited by examiner

ROBOT CONTROL APPARATUS AND ROBOT CONTROL METHOD

FIELD

The present invention relates to a robot control apparatus and a robot control method for driving a plurality of robots while synchronizing the robots with one another.

BACKGROUND

For the purpose of carrying out effective production making use of a robot, a plurality of industrial robots have been installed in a production system to simultaneously carry out plural kinds of work. In particular, in cooperative work for gripping, supporting, and assembling the same workpiece among a plurality of robots that simultaneously carry out plural kinds of work, a problem is an excessive load applied to the workpiece and the robots during the work. The excessive load is caused by shifts of the present gripping positions of the robots. Specifically, the excessive load occurs according to a position error from an ideal gripping position where no load is applied. The position error that causes the load includes a static position error due to an installation position error and a calibration error of the robots and a dynamic position error caused by a response delay of the robots. When force acting on the workpiece and the robots caused by a position posture relation among gripping positions of the respective plurality of robots exceeds a tolerance, it is possible to detect an abnormality, for example, by looking at a current value of a motor and safely stop the robots by performing the abnormality detection. For the purpose of reducing a mutual position error among robots in operation, a large number of technologies for improving synchronization accuracy of fundamental cyclic signals for each of operations have been proposed.

On the other hand, a technology for correcting position postures by force control when a shift of a position posture relation among gripping positions (finger positions) of fingers (end effectors) of a plurality of robots occurs has been developed. According to this technology, the gripping positions are corrected according to forces generated in the fingers and the fingers are controlled to move to positions where forces applied to the fingers are fit within a range of allowable forces. Such a correction technology for position postures can be roughly classified into a master slave system and an impedance control system. The master slave system is a system in which a certain robot is set as a master robot and the other robots are set as slave robots and the master robot carries out position control for an ideal track and the other slave robots operate following the master robot according to force control. As the master slave system, there is also a system called synchronous control system that does not include the force control as a configuration. This system is used in an industrial use as an inexpensive configuration not including a force sensor. A positional relation between the main robot and the slave robots is defined in advance and position command values for the slaves are calculated from the positional relation defined to correspond to a command value of the master (see, for example, Patent Literature 1). The impedance control system is a system for reversely calculating tracks of the robots from a desired track of a handling target object and, when the track is set as the command value, controlling the fingers to positions where an appropriate impedance characteristic is given to the forces applied to the fingers to apply desired motions to the respective robots (see, for example, Patent Literature 2).

CITATION LIST

Patent Literature

Patent Literature 1: Japanese Patent Application Laid-Open No. H7-20915
Patent Literature 2: Japanese Patent Application Laid-Open No. H7-256580
Patent Literature 3: Japanese Patent Application Laid-Open No. 2001-216012
Patent Literature 4: Japanese Patent Application Laid-Open No. 2011-104740

Non Patent Literature

Non Patent Literature 1: Suguru Arimoto "Dynamics and Control of Robots" Asakura Publishing Co., Ltd. 1990

SUMMARY

Technical Problem

However, according to the technologies of Patent Literatures 1 and 2, there is a problem in that, concerning a position error (an absolute position error) of an actual track that occurs during the operations of the robots, track generation for a cooperative operation is not performed taking into account position postures of the robots and fluctuation at each operation speed. Consequently, for example, when a work carried out by cooperative control is made complicated, fluctuation occurs in a static finger position error in the position postures among the robots. Therefore, there is a case in which a force is suddenly generated depending on a posture change of the fingers. As a result, when there is a limit in a force allowed for a work object and a hand, it is difficult to realize a high-speed operation in cooperation.

The present invention has been devised in view of the above and it is an object of the present invention to obtain a robot control apparatus and a robot control method that can reduce a load applied to a gripped workpiece as much as possible in any position on actual tracks of a plurality of robots in a cooperative operation (synchronous driving).

Solution to Problem

In order to solve the aforementioned problems, a robot control apparatus that synchronously drives a first robot and a second robot different from the first robot according to one aspect of the present invention is constructed in such a manner that it includes: a positional-relation-matrix generating unit that generates, on the basis of N first command values for learning per one robot, which are position-corrected command values for positioning the first robot and the second robot on tracks of the first robot and the second robot during the synchronous driving, concerning the respective N first command values for learning, positional relation matrices for defining a positional relation during the synchronous driving between a first command value for learning related to the first robot and a first command value for learning related to the second robot; a first command-value output unit that outputs a first command value for driving at each of M (M>N) operation periods, which is a command value for defining the track of the first robot; a positional-relation-matrix interpolating unit that interpolates the N positional relation matrices and generates a positional relation matrix at the each first command value for driving; and a second command-value generating unit that causes the positional relation matrices corresponding to the M first command values for driving after the interpolation to act on the respective M first command values for driving and generates M second command values for driving, which are command values for defining the track of the second robot, wherein the robot control apparatus drives the first robot on the basis of the first command values for driving and drives the second robot on the basis of the second command values for driving.

Advantageous Effects of Invention

According to the present invention, concerning the command value generation at each of operation periods for the second robot, it is possible to approximately calculate a transformation matrix and generate a command value for the second robot taking into account an error without requiring complicated calculation for identification of motion characteristics of the robots and geometric errors of the robots. Therefore, there is an effect that it is possible to reduce a load applied to a gripped workpiece as much as possible in any position on actual tracks of a plurality of robots in synchronous driving.

DESCRIPTION OF EMBODIMENTS

Embodiments of a robot control apparatus and a robot control method according to the present invention are explained in detail below with reference to the drawings. Note that the present invention is not limited by the embodiments.

First Embodiment.

Figure 1:
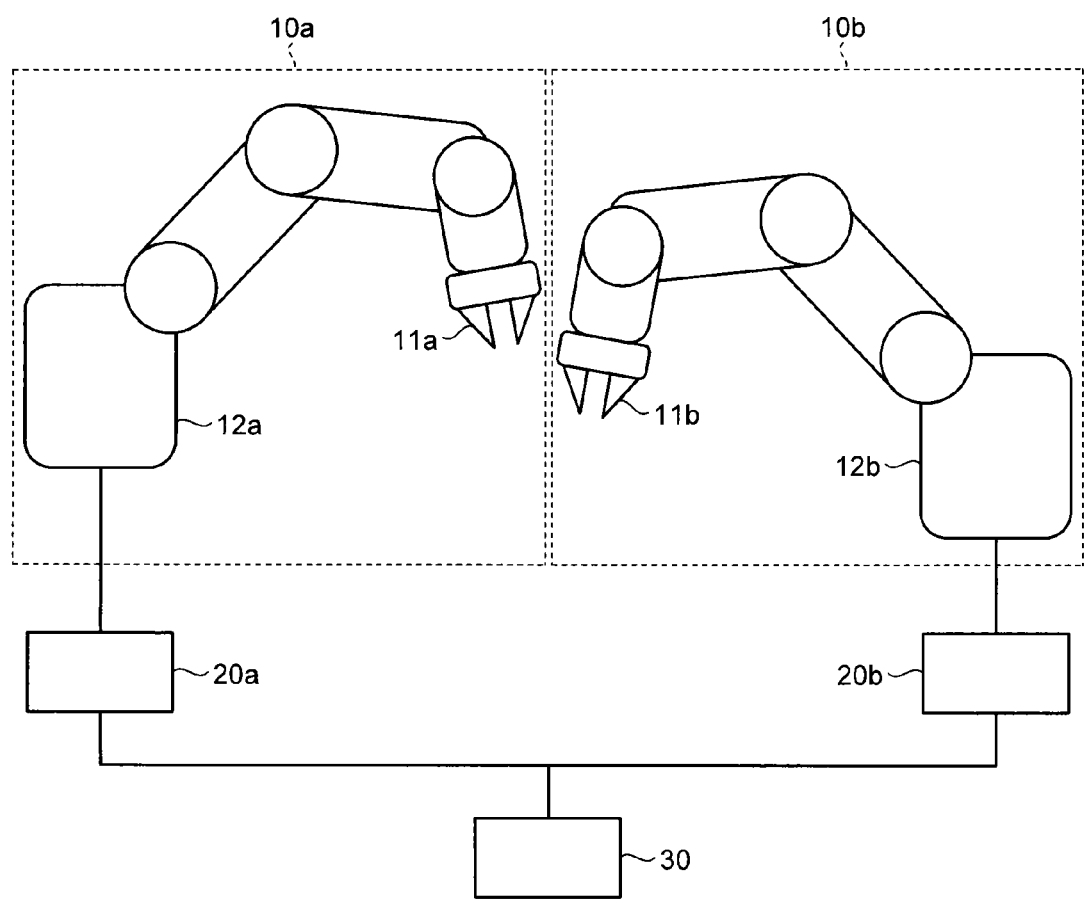
FIG. 1 is a diagram for explaining a production system including a robot control system in a first embodiment of the present invention.

FIG. 1 is a diagram for explaining a production system including a robot control system (a robot control apparatus) in a first embodiment of the present invention. As shown in the figure, the robot control system includes a master robot (a first robot) 10*a*, a slave robot (a second robot) 10*b*, a master control apparatus 20*a* that controls the master robot 10*a*, a slave control apparatus 20*b* that controls the slave robot 10*b*, and a positional-relation calculating apparatus 30. The master robot 10*a* is configured by attaching an arm including an end effector 11*a* at a distal end to an installation stand 12*a*. Similarly, the slave robot 10*b* is configured by attaching an arm including an end effector 11*b* at a distal end to an installation stand 12*b*. Note that, in the following explanation, as an example, it is assumed that the robots 10*a* and 10*b* are six-degree-of-freedom vertical multi-joint robots.

The master control apparatus 20*a*, the slave control apparatus 20*b*, and the positional-relation calculating apparatus 30 are connected to one another by a communication line and configure the robot control system (the robot control apparatus) that drives the master robot 10*a* and the slave robot 10*b* while synchronizing the robots with each other. The master control apparatus 20*a* generates position command values for positioning the end effector 11*a* and drives the end effector 11*a* on the basis of the generated position command values. The master control apparatus 20*a* transmits the position command values related to the end effector 11*a* to the slave control apparatus 20*b*. The positional-relation calculating apparatus 30 calculates positional relation information for specifying a positional relation between the end effectors 11*a* and 11*b* during a cooperative operation such that the end effector 11*a* and the end effector 11*b* can hold the same workpiece and convey the work piece (the gripped workpiece) in cooperation. The positional-relation calculating apparatus 30 transmits the obtained positional relation information to the slave control apparatus 20*b*. The slave control apparatus 20*b* causes the positional relation information between the end effectors 11*a* and 11*b* to act on the position command values for positioning the end effector 11*a* to calculate position command values for positioning the end effector 11*b*. The slave control apparatus 20*b* drives the end effector 11*b* on the basis of the calculated position command values.

Figure 2:
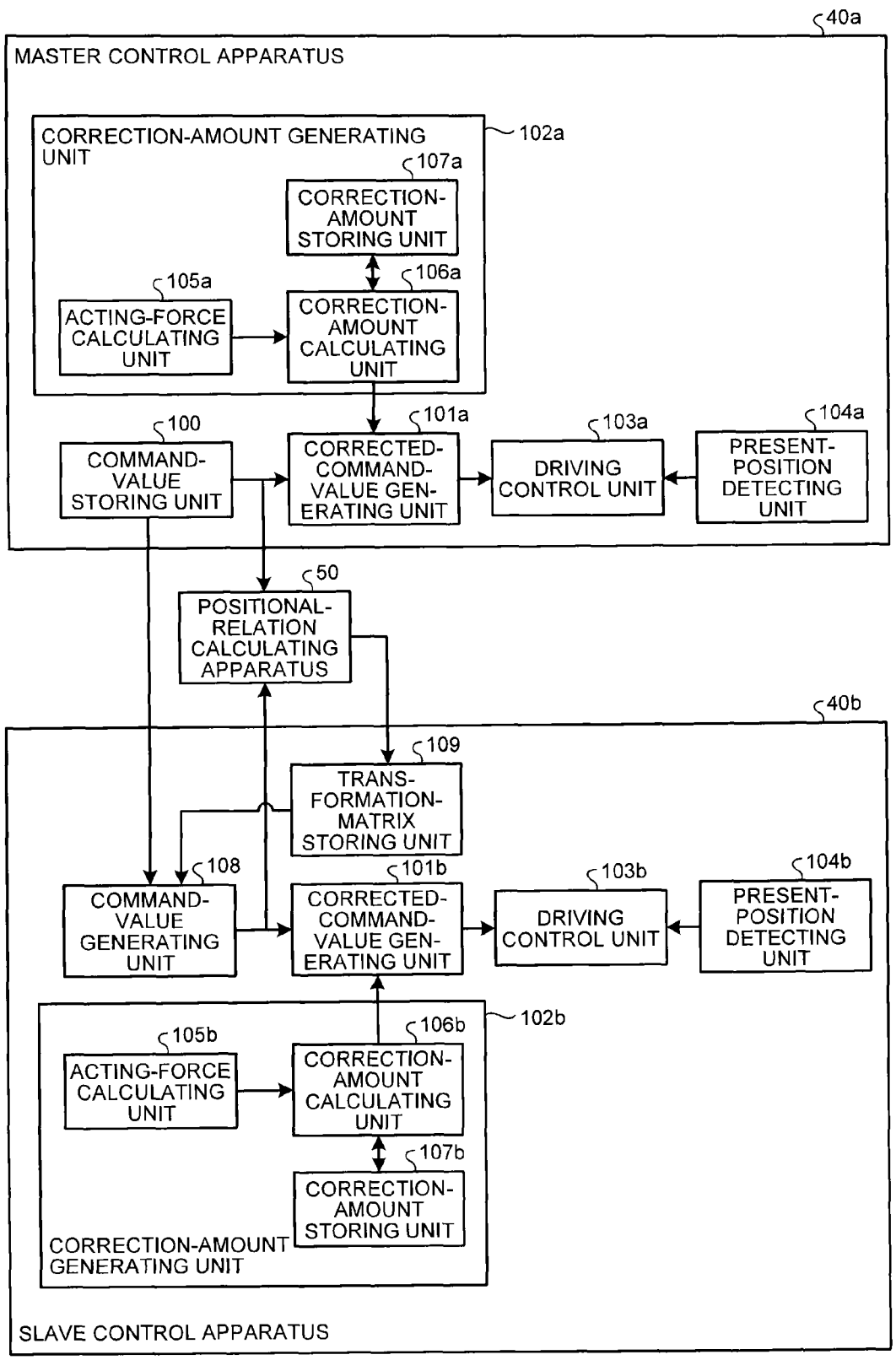
FIG. 2 is a diagram for explaining the configuration of a robot control system according to a comparative example.

A technology compared with the first embodiment of the present invention (hereinafter referred to as comparative example) is explained. FIG. 2 is a diagram for explaining the configuration of a robot control system according to the comparative example. Note that, to distinguish the comparative example from the first embodiment, a positional-relation calculating apparatus to which the comparative example is applied is denoted by reference numeral 50, a master control apparatus to which the comparative example is applied is denoted by reference sign 40a, and a slave control apparatus to which the comparative example is applied is denoted by reference sign 40b. Concerning the components included in the master control apparatus 40a and the slave control apparatus 40b and having the same functions with an only difference as to whether an acting target is a master system (the master robot 10a and the master control apparatus 40a) or a slave system (a slave robot 10b and the slave control apparatus 40b), the components are distinguished from each other by adding an alphabet "a" to reference numerals when the components are included in the master system and adding an alphabet "b" to reference numerals when the components are included in the slave system. Concerning two components having the same function, but different only in systems in which the components are included, in some case, only one of the components is explained and explanation of the other is omitted.

The master control apparatus 40a includes a command-value storing unit 100 that stores in advance M position command values for defining a command track of the end effector 11a at each of operation periods, a correction-amount generating unit 102a that calculates a correction amount (a Tm-th correction amount) for a Tm-th (Tm is an integer satisfying 1≤T≤M) command value (a Tm-th command value) among the M position command values (hereinafter simply referred to as command values), a corrected-command-value generating unit 101a that generates, on the basis of the Tm-th command value and the Tm-th correction amount, a Tm-th corrected command value obtained by correcting the Tm-th command value, a driving control unit 103a including a servo amplifier and a servo motor that drives the master robot 10a such that the end effector 11a follows the Tm-th corrected command value, and a present-position detecting unit 104a including an encoder that performs detection of the present position (a Tm-th present position) of the end effector 11a in operation based on the Tm-th corrected command value and feeds back the Tm-th present position to the driving control unit 103a.

The correction-amount generating unit 102a includes an acting-force calculating unit 105a, a correction-amount calculating unit 106a, and a correction-amount storing unit 107a. The acting-force calculating unit 105a calculates an acting force generated in the end effector 11a. The correction-amount storing unit 107a accumulates and stores calculated correction amounts (i.e., a T1-th correction amount to a Tm-1-th correction amount). The correction-amount calculating unit 106a calculates the Tm-th correction amount using the T1-th correction amount to the Tm-1-th correction amount to reduce the acting force generated in the end effector 11a. The calculated Tm-th correction amount is transmitted to the corrected-command-value generating unit 101a and stored in the correction-amount storing unit 107a.

The positional-relation calculating apparatus 50 calculates a matrix (a transformation matrix) for defining a positional relation between a command value for positioning the end effector 11a and a command value for positioning the end effector 11b. The positional-relation calculating apparatus 50 can obtain the command value for positioning the end effector 11b by causing the transformation matrix to act on the command value for positioning the end effector 11a.

The slave control apparatus 40b includes a transformation-matrix storing unit 109 that stores a transformation matrix calculated by the positional-relation calculating apparatus 50, a command-value generating unit 108 that causes the transformation matrix stored by the transformation-matrix storing unit 109 to act on the Tm-th command value for positioning the end effector 11a to generate a Tm-th command value for positioning the end effector 11b, a correction-amount generating unit 102b that calculates a Tm-th correction amount for correcting the Tm-th command value related to the end effector 11b, a corrected-command-value generating unit 101b that generates a Tm-th corrected command value on the basis of the Tm-th command value and the Tm-th correction amount related to the end effector 11b, a driving control unit 103b including a servo amplifier and a servo motor that drives the slave robot 10b on the basis of the Tm-th corrected command value related to the end effector 11b, and a present-position detecting unit 104b including an encoder that performs detection of a Tm-th present position of the end effector 11b and feeds back the detected Tm-th present position to the driving control unit 103b. The correction-amount generating unit 102b includes a configuration same as the configuration of the correction-amount generating unit 102a. Therefore, explanation of the correction-amount generating unit 102b is omitted.

The transformation matrix calculated by the positional-relation calculating apparatus 50 is explained. The transformation matrix is generally called homogeneous transformation matrix representing a rotation amount and a position. When an orthogonal coordinate system is represented as $\Sigma i$ and a transformation matrix between two orthogonal coordinate systems $\Sigma 1$ and $\Sigma 2$ is represented as $^1T_2$, if a rotation matrix is represented as $^1R_2$ (a square matrix of 3×3 elements), the position of the orthogonal coordinate system $\Sigma 2$ viewed from the orthogonal coordinate system $\Sigma 1$ is represented as $^1P_2$ (a vector of 3×1 elements), and a zero vector of 1×3 is represented as zero(1,3), the homogenous transformation matrix is represented as indicated by the following Formula (1):

$$^1T_2 = [^1R_2, ^1P_2; \text{zero}(1,3), 1] \qquad (1)$$

Note that, when a position posture of a point "a" is represented as $^1T_a$ with respect to one coordinate system $\Sigma i$, a position posture $^{i+1}T_a$ of the point "a" with respect to another coordinate system $\Sigma i+1$ is represented as indicated by the following Formula (2) using a transformation matrix $^{i+1}T_i$ from $\Sigma i$ to $\Sigma i+1$.

$$^{i+1}T_a = {}^{i+1}T_i * {}^i T_a \qquad (2)$$

Figure 3:
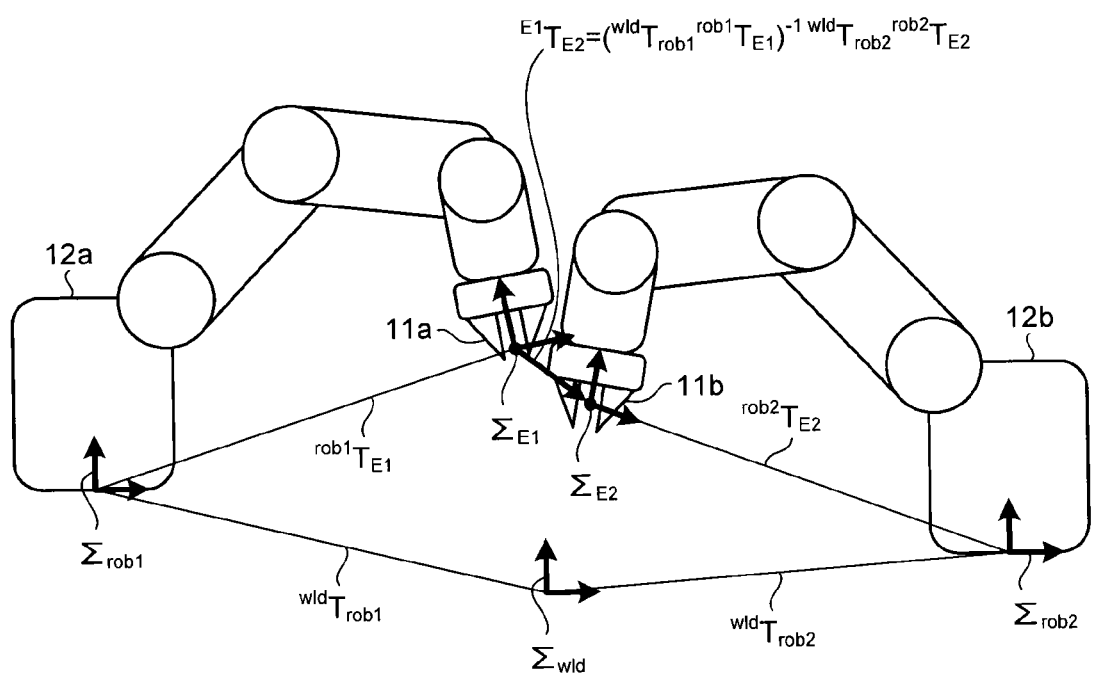
FIG. 3 is a diagram for explaining an ideal positional relation between end effectors.

FIG. 3 is a diagram for explaining an ideal positional relation between the end effectors 11a and 11b. $\Sigma_{rob1}$ is a coordinate system (a master robot coordinate system) with respect to the installation stand 12a, $\Sigma_{rob2}$ is a coordinate system (a slave robot coordinate system) with respect to the installation stand 12b, $\Sigma_{wld}$ is an absolute coordinate system (a world coordinate system), $\Sigma_{E1}$ is a coordinate system with respect to the end effector 11a, and $\Sigma_2$ is a coordinate system with respect to the end effector 11b. An ideal environment is an environment in which a commanded angle and a commanded position coincide with each other, in other words, an environment without an absolute position error. In such an environment, the following Formula (3) can be used as a transformation matrix between the master and the slave. Note that "$A^{-1}$" represents an inverse matrix concerning a matrix A.

$$^{E1}T_{E2} = (^{wld}T_{rob1}{}^{rob1}T_{E1})^{-1}{}^{wld}T_{rob2}{}^{rob2}T_{E2} \quad (3)$$

However, in a real environment, an absolute position error occurs in finger positions of the end effectors 11a and 11b because of an installation error, a backlash, a bend of an arm, an error of the end effectors 11a and 11b, the influence of the rigidity of a decelerator, and the like. Therefore, in general, a positional relation between the finger positions and a workpiece is not a desirable positional relation. When starting the production system, a user operates, for example, a not-shown control board for teaching to thereby move the real robots 10a and 10b while checking a positional relation between the robots 10a and 10b and the workpiece, for example, visually to adjust the errors to command values such that a desired operation is executed while a desired relative positional relation is kept between the end effectors 11a and 11b. Command values $^{robi}T'_{Ei}$ (i=1 and 2) in the control apparatuses 20a and 20b at the time when the user moves the end effectors 11a and 11b to places where the errors are reduced are set as command values for positioning the end effectors 11a and 11b at the teaching points. Note that "'" is added to a transformation matrix where position adjustment by the teaching is taken into account.

The command values $^{robi}T'_{Ei}$ (i=1 and 2) to which the errors are adjusted are input to the positional-relation calculating apparatus 50. The positional-relation calculating apparatus 50 substitutes command values $^{rob1}T'_{E1}$ and $^{rob2}T'_{E2}$ after the adjustment respectively to $^{rob1}T_{E1}$ and $^{rob2}T_{E2}$ of Formula (3) and sets the thus obtained $^{E1}T'_{E2}$ as $^{E1}T'_{E2}$.

In this way, $^{E1}T'_{E2}$ is calculated before a normal operation (synchronous driving of the robots 10a and 10b; hereinafter also referred to as "automatic operation") is started. The calculated $^{E1}T'_{E2}$ is used as a transformation matrix for position transformation during the automatic operation. That is, during the automatic operation, in the salve control apparatus 40b, for the purpose of performing an operation for following a corrected command value of the master control apparatus 40a, a command value for the end effector 11b is generated in the command-value generating unit 108 using a command value on the master control apparatus 40a side and the transformation matrix. In this case, the command-value generating unit 108 calculates the command value $^{rob2}T_{E2}$ of the slave control apparatus 40b on the basis of the following Formula (4) using a transformation matrix $^{wld}T_{rob1}$ into a master robot coordinate system with respect to a world coordinate system, a transformation matrix $^{wld}T_{rob2}$ into a slave robot coordinate system with respect to the world coordinate system, and the transformation matrix $^{E1}T'_{E2}$.

$$^{rob2}T_{E2} = (^{wld}T_{rob2})^{-1} * ^{rob1}T_{E1} * ^{E1}T'_{E2} \quad (4)$$

However, in the comparative example, the transformation matrix used for the transformation of the command value between the master and the slave is fixed to $^{E1}T'_{E2}$ calculated at a teaching point acquired in a specific robot posture. Therefore, even if the command value is corrected on the basis of an acting force, it is difficult to keep a positional relation between the robots or between the robots and the workpiece in a fixed state in all positions on tracks in the cooperative operation. Therefore, in the first embodiment, the transformation matrix $^{E1}T'_{E2}$ is calculated for the respective M command values such that the positional relation between the robots or between the robots and the workpiece can be kept fixed in all positions on the tracks in the cooperative operation.

Figure 4:
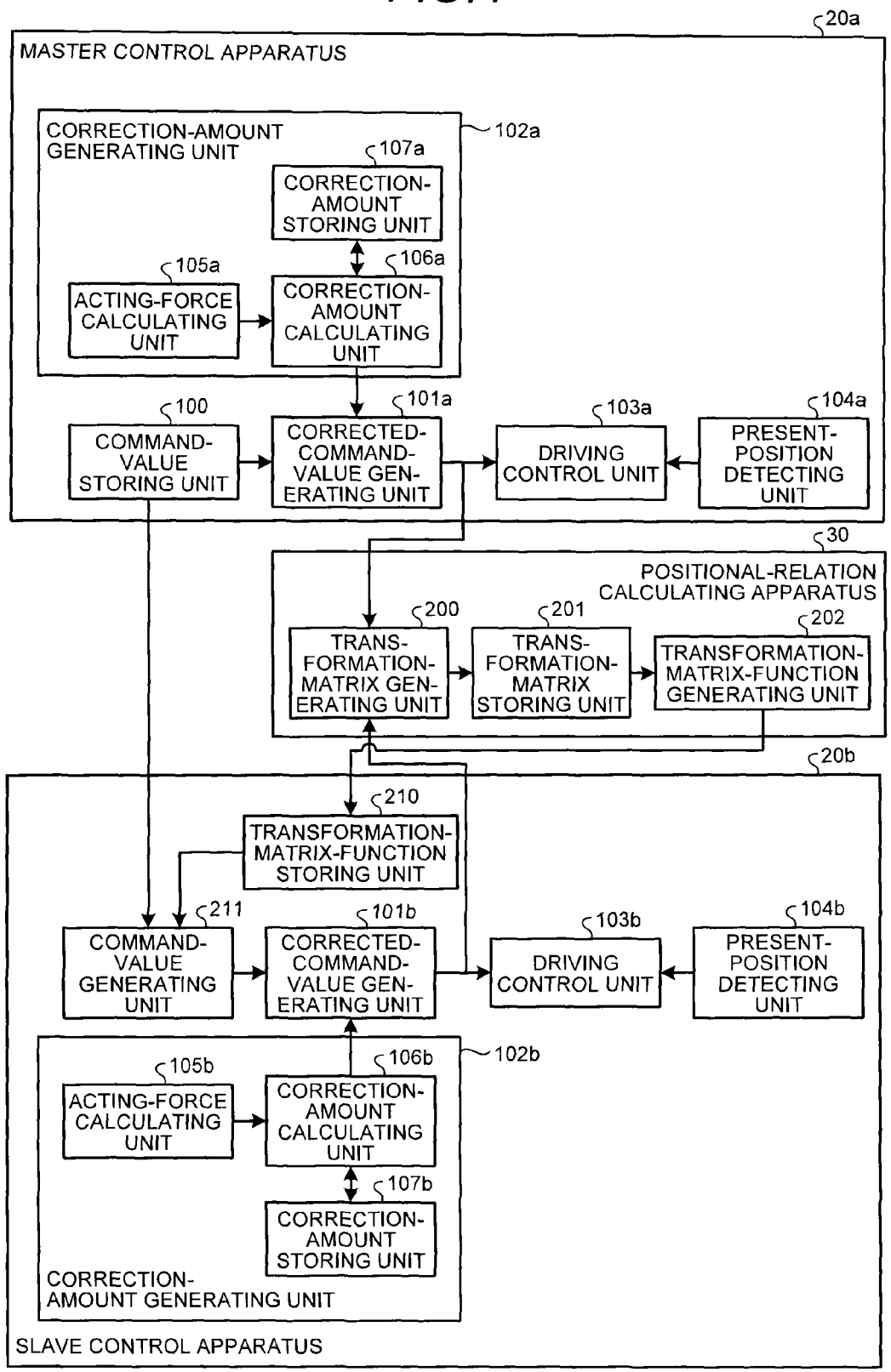
FIG. 4 is a diagram for explaining the configuration of the robot control system in the first embodiment.

FIG. 4 is a diagram for explaining a robot control system including a positional-relation calculating apparatus in the first embodiment of the present invention. Components having functions same as the functions in the comparative example are denoted by the same reference numerals and signs and redundant explanation of the components is omitted.

As shown in the figure, the master control apparatus 20a includes the command-value storing unit 100, the correction-amount generating unit 102a, the corrected-command-value generating unit 101a, the driving control unit 103a, and the present-position detecting unit 104a. The correction-amount generating unit 102a includes the acting-force calculating unit 105a, the correction-amount calculating unit 106a, and the correction-amount storing unit 107a.

The positional-relation calculating apparatus 30 includes a transformation-matrix generating unit 200 that calculates, on the basis of command values for positioning at N (N is a natural number smaller than M and equal to or smaller than 2) teaching points including an operation start position, transformation matrices (transformation matrices for learning) concerning the respective teaching points, a transformation-matrix storing unit 201 that stores N transformation matrices for learning, and a transformation-matrix-function generating unit 202 that calculates a transformation matrix function on the basis of the N transformation matrices for learning. Details of the transformation matrix function are explained below. The calculated transformation matrix function is transmitted to the slave control apparatus 20b as positional relation information in the first embodiment.

The slave control apparatus 20b includes a transformation-matrix-function storing unit 210 that stores the transformation matrix function calculated by the positional-relation calculating apparatus 30, a command-value generating unit 211 that generates, on the basis of the Tm-th command value (a first command value for driving) for the end effector 11a and the transformation matrix function, a Tm-th command value (a second command value for driving) for positioning the end effector 11b, the correction-amount generating unit 102b, the corrected-command-value generating unit 101b, the driving control unit 103b, and the present-position detecting unit 104b. The correction-amount generating unit 102b includes a configuration equivalent to the configuration of the correction-amount generating unit 102a.

According to the first embodiment, the corrected-command-value generating units 101a and 101b and the correction-amount generating units 102a and 102b cooperate with each other to function as a position-corrected-command-value generating unit that generates a position-corrected command value (a command value for learning or a first command value for learning explained below) for each of robots positioned on tracks at the respective N command values during the simultaneous driving. The command-value storing unit 100 functions as a first command-value output unit that outputs a command value (a first command value for driving) at each of M (M>N) operation periods for defining a track of the end effector 11a. Note that, in the following explanation, it is assumed that the command-value storing unit 100 stores a command value in advance and outputs the stored command value. However, a functional unit that sequentially generates a command value on the basis of a predetermined calculation can be adopted as the first command-value output unit. The transformationmatrix-function generating unit 202 and the command-value generating unit 211 cooperate with each other to function as a positional-relation-matrix interpolating unit that interpolates the N transformation matrices and generates a transformation matrix for each of command values for the end effector 11a. The command-value generating unit 211 functions as a second command-value generating unit that causes the transformation matrix after the interpolation to act on the respective command values at each of the operation periods to generate M command values (second command values for driving) for defining a track of the end effector 11b.

Figure 5:
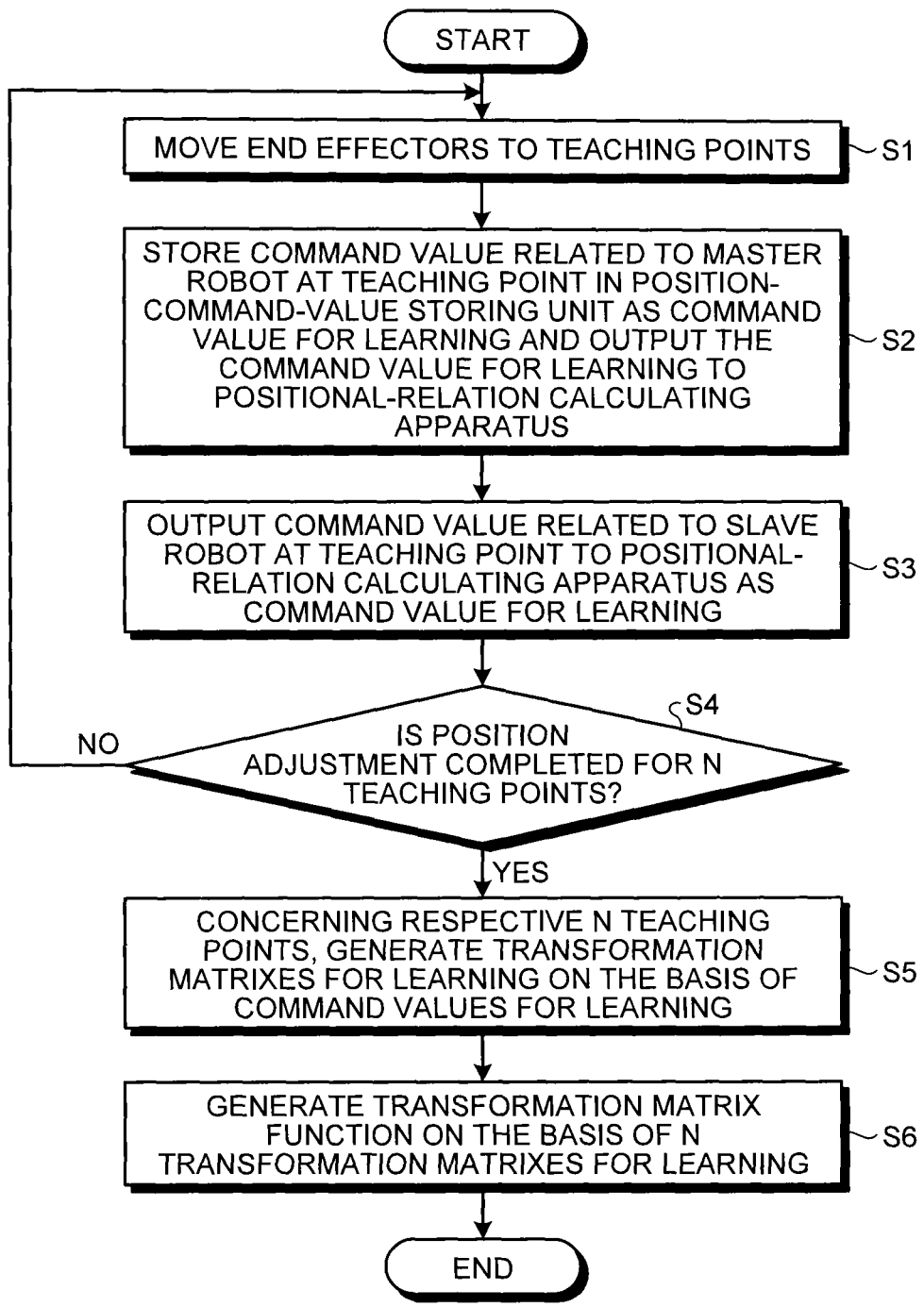
FIG. 5 is a flowchart for explaining preparation processing in the first embodiment.

A robot control method in the first embodiment of the present invention executed using the robot control system shown in FIG. 4 is explained. FIG. 5 is a flowchart for explaining preparation processing executed offline within the robot control method in the first embodiment.

First, the user moves the end effectors 11a and 11b to the teaching points on tracks during a cooperative operation using the operation board for teaching or the like (step S1). In this case, the user can, for example, cause the end effectors 11a and 11b to actually grasp a workpiece to adjust finger positions of the end effectors 11a and 11b and cause the control apparatuses 20a and 20b to acquire positions at this point. Note that the position adjustment is executed at respective N teaching points.

The corrected-command-value generating unit 101a stores a position of the end effector 11a obtained at a Tk-th (Tk is an integer satisfying 1≤Tk≤N) teaching point in the command-value storing unit 100 as a Tk-th command value (command value for learning) related to the master robot 10a and outputs the command value for learning to the positional-relation calculating apparatus 30 (step S2). The corrected-command-value generating unit 101b outputs the position of the end effector 11b subjected to step S2 to the positional-relation calculating apparatus 30 as a Tk-th command value for learning related to the slave robot 10b (step S3).

Note that, when the end effectors 11a and 11b are caused to actually grasp the workpiece to perform the position adjustment, the correction-amount generating unit 102a continues the calculation of a correction amount until the acting force calculated by the acting-force calculating unit 105a is corrected to be equal to or smaller than a predetermined value. The corrected-command-value generating unit 101a can update, with a sequentially calculated correction amount, a correction amount added to a predetermined command value supplied from the command-value storing unit 100 and, when a corrected command value with which the acting force becomes equal to or smaller than the predetermined value is obtained, set the corrected command value as a command value for learning. Note that the measurement of an acting force, the calculation of a correction amount based on the measured acting force, and the correction of a command value by the calculated correction amount are executed also in the slave control apparatus 20b in the same manner. An obtained corrected command value is output as a command value for learning by the processing at step S3. Note that a command value provisionally supplied to the corrected-command-value generating units 101a and 101b during the adjustment of the position can be a predetermined fixed value.

A measuring method for an acting force by the acting-force calculating unit 105a can be any method. For example, it is possible to adopt a method of attaching a force sensor to a wrist portion of a robot and setting a detection value by the force sensor as a measurement value of an acting force or a method of estimating a finger acting force f (3 axis forces+3 moments) with statics from a torque $\tau$ using Jacobian J (a degree of freedom of the robot) ($\tau=J^T*f$, where $J^T$ is a transposed matrix of a matrix J). Further, it is possible to adopt a method of calculating torques of shafts of robots 10a and 10b from motor currents of the shafts and estimating a finger acting force from outputs of the calculated torques or a method of attaching torque sensors to the shafts and estimating an acting force from output torques obtained from the torque sensors instead of the motor currents.

Note that, in the following explanation, it is assumed that the end effectors 11a and 11b are caused to actually grasp the workpiece to perform position adjustment and a corrected command value is recorded as a command value for learning. However, when the position adjustment is performed without causing the end effectors 11a and 11b to grasp the work, the corrected-command-value generating unit 101a can set, as the command value for learning, a position detection value detected by the present-position detecting unit 104a and used as a feedback signal. The same applies to the slave control apparatus 20b. Even when the end effectors 11a and 11b are caused to actually grasp the workpiece to perform the position adjustment, a position detection value detected by the present-position detecting units 104a and 104b can be set as the command value for learning.

When the control apparatuses 20a and 20b do not include means for measuring an acting force, the user can manually finely adjust the position of the end effector 11b every time a work area or a posture changes. In this case, the slave control apparatus 20b can drive the end effector 11b by causing a fixed transformation matrix $^{1E}T_{E2}$ provisionally set in advance to act on a teaching point for the master robot 10a. The user can observe, every time a posture or a position changes, a state of the workpiece visually or by adding a sensor, which can detect a force or deformation, to the workpiece and perform fine adjustment using the operation board on the basis of a result of the observation. Note that it is assumed that a case in which the acting force cannot be measured is either when a sensor for measuring the acting force is simply absent in the end effectors 11a and 11b and a function for performing finger acting force calculation from a motor output is absent or when the master side robot is in contact with the workpiece but the slave side robot is not in contact with the work during the cooperative operation.

The user determines whether the position adjustment is performed concerning all the (N) teaching points (step S4). When the position adjustment concerning all the teaching points is not performed (No at step S4), at step S1, the user performs position adjustment for the next teaching point.

In this way, the end effector 11a is moved to the teaching point and the end effector 11b is moved to a position corresponding to the end effector 11a on the teaching point. Consequently, it is possible to obtain command values to which the absolute position error is adjusted (position corrected command values) in the respective N command values on the tracks of the end effectors 11a and 11b.

When the position adjustment for all the teaching points is completed (Yes at step S4), in the positional-relation calculating apparatus 30, the transformation-matrix generating unit 200 receives, as inputs, the Tk-th command value for learning and the corrected command value generated by the corrected-command-value generating unit 101b at the point when the Tk-th command value for learning is determined and generates a Tk-th transformation matrix (transformation matrix for learning) (step S5). Note that the transformation-matrix generating unit 200 stores the generated transformation matrix for learning in the transformation-matrix storing unit 201. The generation of the transformation matrix for learning is executed concerning the respective N teaching points.

Subsequently, the transformation-matrix-function generating unit 202 generates a transformation matrix function on the basis of N transformation matrices for learning stored in the transformation-matrix storing unit 201 (step S6).

The transformation matrix function is a function for specifying a transformation matrix group for interpolating N transformation matrices $^{E1}T'_{E2}(k)$, k1, 2, . . . , N. An entire track is divided into N−1 sections on the basis of the N command values for learning. The function has moving rates "rate" in the respective sections as variables. A calculation method for a transformation matrix function by the transformation-matrix-function generating unit 202 is explained below.

When a distance between a k-th command value for learning Pk and a k+1-th command value for learning Pk+1 is represented as La11(k, k+1) and a residual moving distance at present time Tnow is represented as Lr(k,k+1, Tnow), a moving rate rate(k,k+1,Tnow) is defined as indicated by the following Formula (5):

$$\text{rate}(k,k+1,T\text{now})=(La11(k,k+1)-Lr(k,k+1,T\text{now}))/(La11(k,\ k+1)) \quad (5)$$

A transformation matrix in a present position represented by rate(k,k+1,Tnow) can be calculated by a transformation matrix function $^{E1}T'_{E2}(\text{rate}(k,k+1,T\text{now}))$. A method of calculating a rotation component and a translation component of the transformation matrix function $^{E1}T'_{E2}(\text{rate}(k,k+1,T\text{now}))$ is explained.

First, a translation position $^{E1}P'_{E2}(\text{rate}(k,k+1,T\text{now}))$ is calculated as explained below. When fluctuation in relative translation of finger positions of the end effectors 11a and 11b in Pk and Pk+1 is represented as rotation matrix ΔPk, ΔPk is represented by the following Formula (6):

$$\Delta Pk = {^{E1}P'_{E2}(Pk+1)} - {^{E1}p'_{E2}(Pk)} \quad (6)$$

Therefore, when the present position of the end effector 11a is present in rate(k,k+1,Tnow), a translation position $^{E1}p'_{E2}(\text{rate}(k,k+1,T\text{now}))$ is represented as indicated by the following Formula (7) using Δk:

$$^{E1}p'_{E2}(\text{rate}(k,k+1,T\text{now})) = {^{E1}p'_{E2}(Pk)} + \Delta Pk * \text{rate}(k,k+1,T\text{now}) \quad (7)$$

A method of calculating a rotation matrix $^{E1}R'_{E2}(\text{rate}(k,k+1,T\text{now}))$, which is a rotation component of the transformation matrix function $^{E1}T'_{E2}(\text{rate}(k,k+1,T\text{now}))$, is explained. When fluctuation in a relative rotation matrix of finger positions of the end effectors 11a and 11b in Pk and Pk+1 is represented as rotation matrix ΔRk, ΔRk is represented by the following Formula (8):

$$\Delta Rk = ({^{E1}R'_{E2}(Pk)})({^{E1}R'_{E2}(Pk+1)})^{-1} \quad (8)$$

As a method of representing the moving rate rate(k,k+1, Tnow) between Pk and Pk+1, for example, there is known a method of representing a rotation matrix using a rotation axis vector k and a rotation amount α obtained by using a one-axis rotation method. In this case, a method of changing α according to rate(k,k+1,Tnow) is adopted. Specifically, when the one-axis rotation method is used, ΔRk is equivalently represented using the rotation axis vector k and the rotation amount α. There is the following relational formula for a rotation matrix and [k, α]:

$$\Delta Rk = [kx^2 * V\alpha + C\alpha, kx * ky * V\alpha + C\alpha, kx * kz * V\alpha + C\alpha; \\ ky * kx * V\alpha + C\alpha, ky^2 * V\alpha + C\alpha, ky * kz * V\alpha + C\alpha; \\ kz * kx * V\alpha + C\alpha, kz * ky * V\alpha + C\alpha, kz^2 * V\alpha + C\alpha] \quad (9)$$

$$k = [kx, ky, kz] \quad (10)$$

$$V\alpha = 1 - C\alpha \quad (11)$$

$$C\alpha = \cos \alpha \quad (12)$$

In this case, α is defined as described below as αnow that changes according to the moving rate rate:

$$\alpha\text{now} = \alpha * \text{rate}(k, k+1, T\text{now}) \quad (13)$$

By using the present rotation amount αnow, the present fluctuation ΔR(rate(k,k+1,Tnow) is defined as follows:

$$\Delta R(\text{rate}(k,k+1,T\text{now})) = [kx^2 * V\alpha\text{now} + C\alpha\text{now}, \\ kx * ky * V\alpha\text{now} + C\alpha\text{now}, kx * kz * V\alpha\text{now} + C\alpha\text{now}; \\ ky * kx * V\alpha\text{now} + C\alpha\text{now}, ky^2 * V\alpha\text{now} + C\alpha\text{now}, \\ ky * kz * V\alpha\text{now} + C\alpha\text{now}; kz * kx * V\alpha\text{now} + C\alpha\text{now}, \\ kz * ky * V\alpha\text{now} + C\alpha\text{now}, kz^2 * V\alpha\text{now} + C\alpha\text{now}] \quad (14)$$

$$^{E1}R'_{E2}(\text{rate}(k,k+1,T\text{now})) = ({^{E1}R'_{E2}(Pk)}) * \Delta R(\text{rate}(k,k+1,T\text{now})) \quad (15)$$

When ΔR(rate_k,k+1) is changed according to a moving position, besides, it is possible to adopt a method of calculating a rotation matrix using a quaternion representation and transforming the result calculated by quaternion into a rotation matrix.

A transformation matrix $^{E1}T'_{E2}(\text{rate}(k,k+1,T\text{now}))$ is represented as follows using the translation position $^{E1}p'_{E2}(\text{rate}(k,k+1,T\text{now}))$ and the rotation matrix $^{E1}R'_{E2}(\text{rate}(k,k+1,T\text{now}))$ obtained by the calculation explained above:

$$^{E1}T'_{E2}(\text{rate}(k,k+1,T\text{now})) = [{^{E1}R'_{E2}(\text{rate}(k,k+1,T\text{now}))}, \\ {^{E1}P'_{E2}(\text{rate}(k,k+1,T\text{now}))}; \text{zero}(1,3), 1] \quad (16)$$

The transformation matrix function calculated by the transformation-matrix-function generating unit 202 on the basis of the calculation method is transmitted to the slave control apparatus 20b and stored in the transformation-matrix-function storing unit 210.

The preparation processing for the cooperative operation is completed by the processing at steps S1 to S6. Thereafter, the user can cause the robot control system to start the automatic operation.

Figure 6:
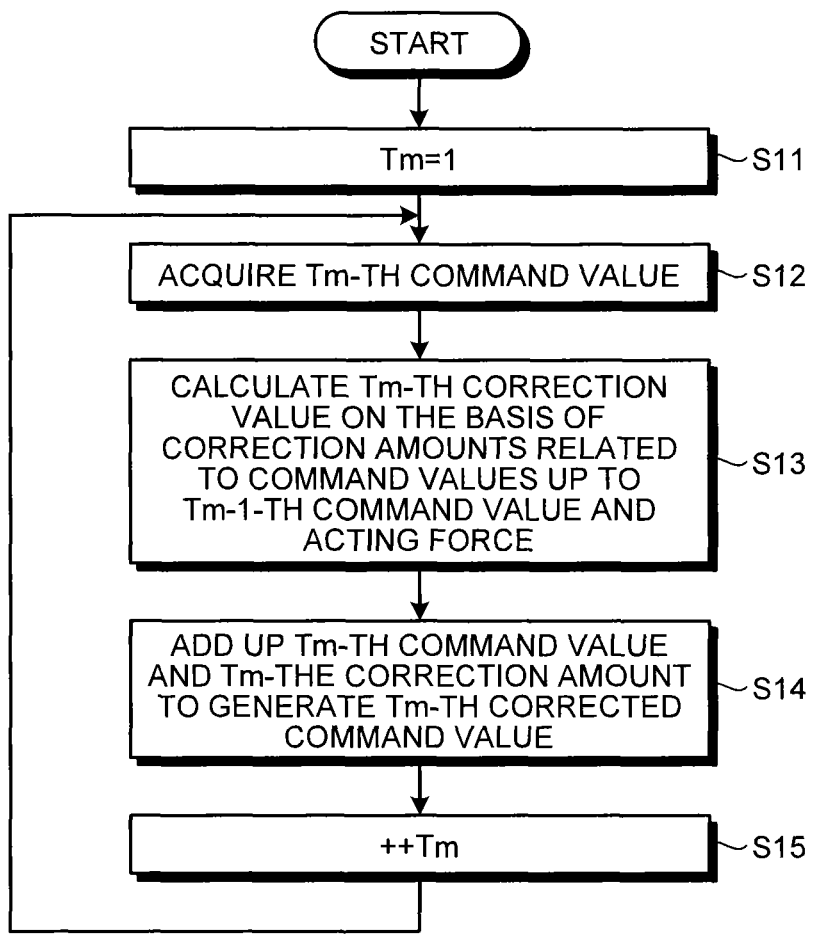
FIG. 6 is a flowchart for explaining an operation during automatic operation of a master control apparatus in the first embodiment.
Figure 7:
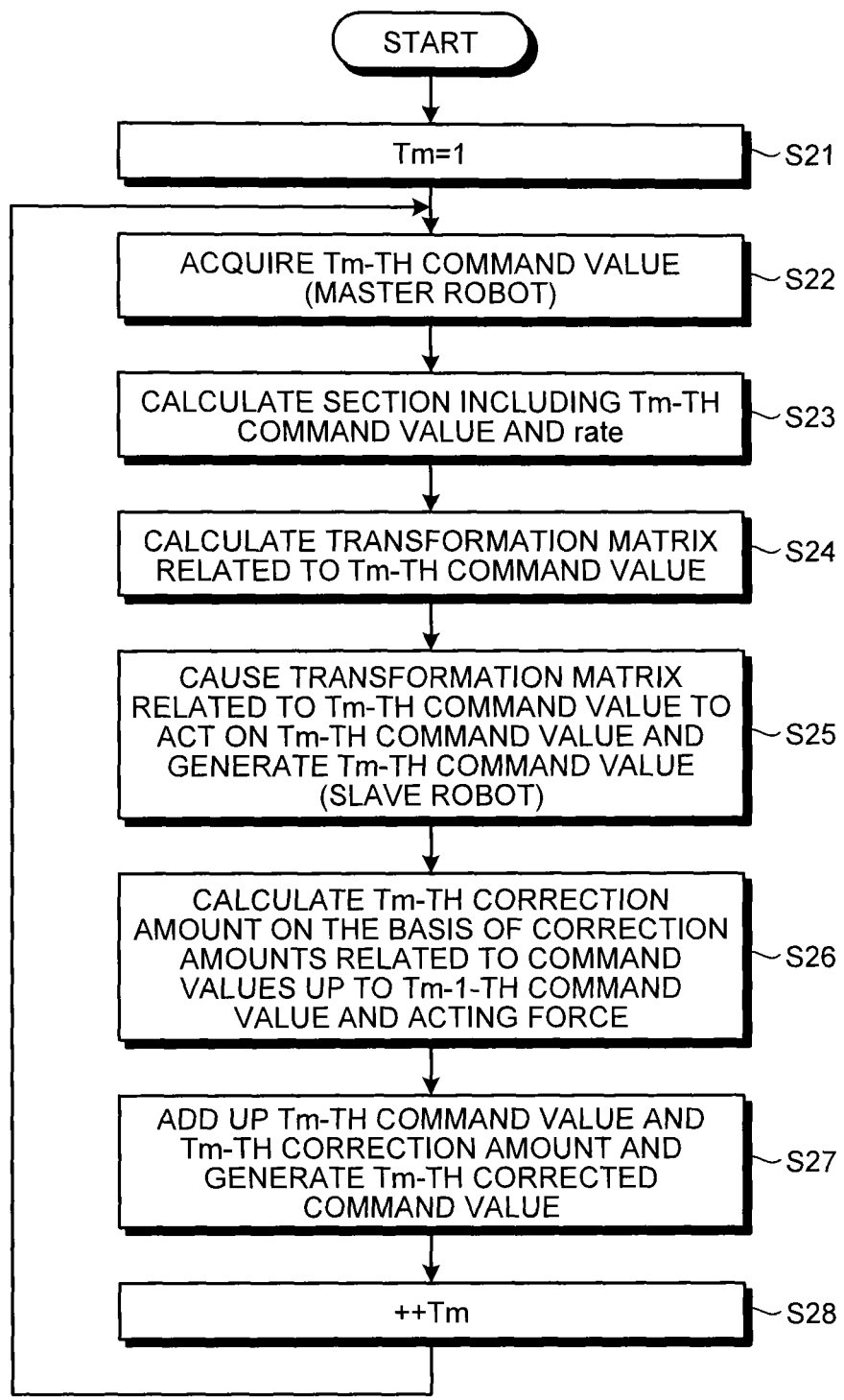
FIG. 7 is a flowchart for explaining an operation during automatic operation of a salve control apparatus in the first embodiment.

FIG. 6 is a flowchart for explaining an operation during the automatic operation of the master control apparatus 20a within the robot control method in the first embodiment. FIG. 7 is a flowchart for explaining an operation during the automatic operation of the slave control apparatus 20b in the robot control method in the first embodiment.

In the master control apparatus 20a, as shown in FIG. 6, first, the corrected-command-value generating unit 101a initializes Tm with 1 (step S11) and extracts the Tm-th command value stored in the command value storing unit 100 (step S12). On the other hand, the correction-amount generating unit 102a calculates a Tm-th correction amount on the basis of correction amounts related to command values up to the Tm-1-th command value accumulated in the correction-amount storing unit 107a and an acting force measured by the acting-force calculating unit 105a (step S13). The corrected-command-value generating unit 101a adds up the extracted Tm-th command value and the Tm-th correction amount and generates a Tm-th corrected command value (step S14). Note that the driving control unit 103a can perform positioning of the end effector 11a on the basis of the thus generated Tm-th corrected command value. After step S14, the corrected-command-value generating unit 101a increments Tm by 1 (step S15) and executes the processing at step S11. Note that, at step S15, when the value of Tm before the increment is equal to the total. M of command values, Tm=1 can be set.

In the slave control apparatus 20b, as shown in FIG. 7, first, the command-value generating unit 211 initializes Tm with 1 (step S21) and extracts the Tm-th command value stored in the command-value storing unit 100 (step S22). The command-value generating unit 211 calculates a section (a section represented by Pk, Pk+1) including the extracted Tm-th command value and rate(k,k+1,Tnow) (step S23). The command-value generating unit 211 calculates a transformation matrix $^{E1}T_{E2}$(rate (k,k+1,Tnow)) according to Formulas 13 to 16 (step S24). The command-value generating unit 211 causes the calculated transformation matrix $^{E1}T_{E2}$(rate (k,k+1,Tnow)) to act on the acquired Tm-th command value and generates the Tm-th command value for the end effector 11b (step S25). On the other hand, the correction-amount generating unit 102b calculates the Tm-th correction amount on the basis of correction amounts related to command values up to a Tm-1-th command value accumulated in a correction-amount storing unit 107b and an acting force measured by an acting-force calculating unit 105b (step S26). The corrected-command-value generating unit 101b adds up the generated Tm-th command value and the Tm-th correction amount and generates a Tm-th corrected command value (step S27). Note that the driving control unit 103b can perform positioning of the end effector 11b on the basis of the generated Tm-th corrected command value. After step S27, the command-value generating unit 211 increments Tm by 1 (step S28) and executes the processing at step S22. Note that, at step S27, when the value of Tm before the increment is equal to a total M of command values, Tm=1 can be set.

Note that it is assumed that the value of tm in the master control apparatus 20a and the value of Tm in the slave control apparatus 20b synchronize with each other.

Note that a part or all of the command-value storing unit 100, the corrected-command-value generating unit 101a, the acting-force calculating unit 105a, the correction-amount calculating unit 106a, and the correction-amount storing unit 107a can be realized as any one of hardware and software or a combination of the hardware and the software. Realizing as the software means that, in a computer including an arithmetic unit and a storage device, program modules corresponding to the components are stored in the storage device and the arithmetic unit executes the program modules stored in the storage device to thereby realize functions of the components corresponding to the program modules. Note that the functions of the command-value storing unit 100 and the correction-amount storing unit 107a are realized when areas respectively corresponding thereto are secured in the storage device.

Similarly, a part or all of the components of the positional-relation calculating apparatus 30 can be realized as any one of hardware and software or a combination of the hardware and the software. A part or all of the command-value generating unit 211, the transformation-matrix-function storing unit 210, the corrected-command-value generating unit 101b, the acting-force calculating unit 105b, a correction-amount calculating unit 106b, and the correction-amount storing unit 107b can be realized as one of hardware and software or a combination of the hardware and the software.

The master control apparatus 20a, the slave control apparatus 20b, and the positional-relation calculating apparatus 30 are explained as the apparatuses different from one another. However, any two or all of the apparatuses can be realized as one apparatus. Each of the apparatuses can be realized by being divided in to a plurality of apparatuses.

In the above explanation, both of the master control apparatus 20a and the slave control apparatus 20b are explained as performing the correction based on the acting force. However, only one of the control apparatuses can perform the correction based on the acting force.

In the above explanation, the example is explained in which the first embodiment of the present invention is applied to the production system including the two robots (the master robot 10a and the slave robot 10b). However, the first embodiment of the present invention can also be applied to a production system in which a three or more robots operate in cooperation with one another. In that case, the first embodiment can be applied by setting one of the cooperatively operating robots as a master robot and setting the other all robots as slave robots.

As explained above, according to the first embodiment of the present invention, The robot control apparatus is configured to include the transformation-matrix generating unit 200 functioning as the positional-relation-matrix generating unit, which generates, on the basis of the position-corrected command value for each of the robots to be positioned at the respective N command values during the synchronous driving, concerning the respective N command values, the transformation matrix for learning functioning as the positional relation matrix for defining the positional relation among the position-corrected command values of the robots, the command-value storing unit 100 functioning as the first command-value output unit that outputs the command value for the master robot 10a at each of the M (M>N) operation periods for defining the track of the master robot 10a, the transformation-matrix-function generating unit 202 and the command-value generating unit 211 functioning as the positional-relation-matrix interpolating unit that interpolates the N transformation matrices for learning and generates the transformation matrix for each of the command values at each of the operation periods, and the command-value generating unit 211 including the function as the second command-value generating unit that causes the transformation matrix for learning after the interpolation to act on the respective command values at each of the operation periods for the master robot 10a and generates the command value at each of the operation periods for the slave robot 10b. Therefore, it is possible to approximately calculate a transformation matrix at each of the operation periods and generate a command value for the slave robot 10b. Therefore, it is possible to reduce a load applied to a gripped workpiece as much as possible in any position on actual tracks of a plurality of robots in a cooperative operation and realize a high-speed cooperative operation by the robots.

The robot control apparatus in the first embodiment is given teaching points by the user. The master robot 10a and the slave robot 10b are caused to move to the respective N teaching points and stand still by the user. The master robot 10a and the slave robot 10b are configured to include the corrected-command-value generating units 101a and 101b and the correction-amount generating units 102a and 102b operating as the position-corrected-command-value generating unit that generates a command value for each of the robots and sets the command value as a command value for learning every time the master robot 10a and the slave robot 10b are caused to stand still at the respective N teaching points. Therefore, it is unnecessary to adjust setting of a force control system to enable the user to correct an amount equivalent to an absolute position error in all sections, and accordingly, it is made possible to reduce a startup time.

Second Embodiment.

Figure 8:
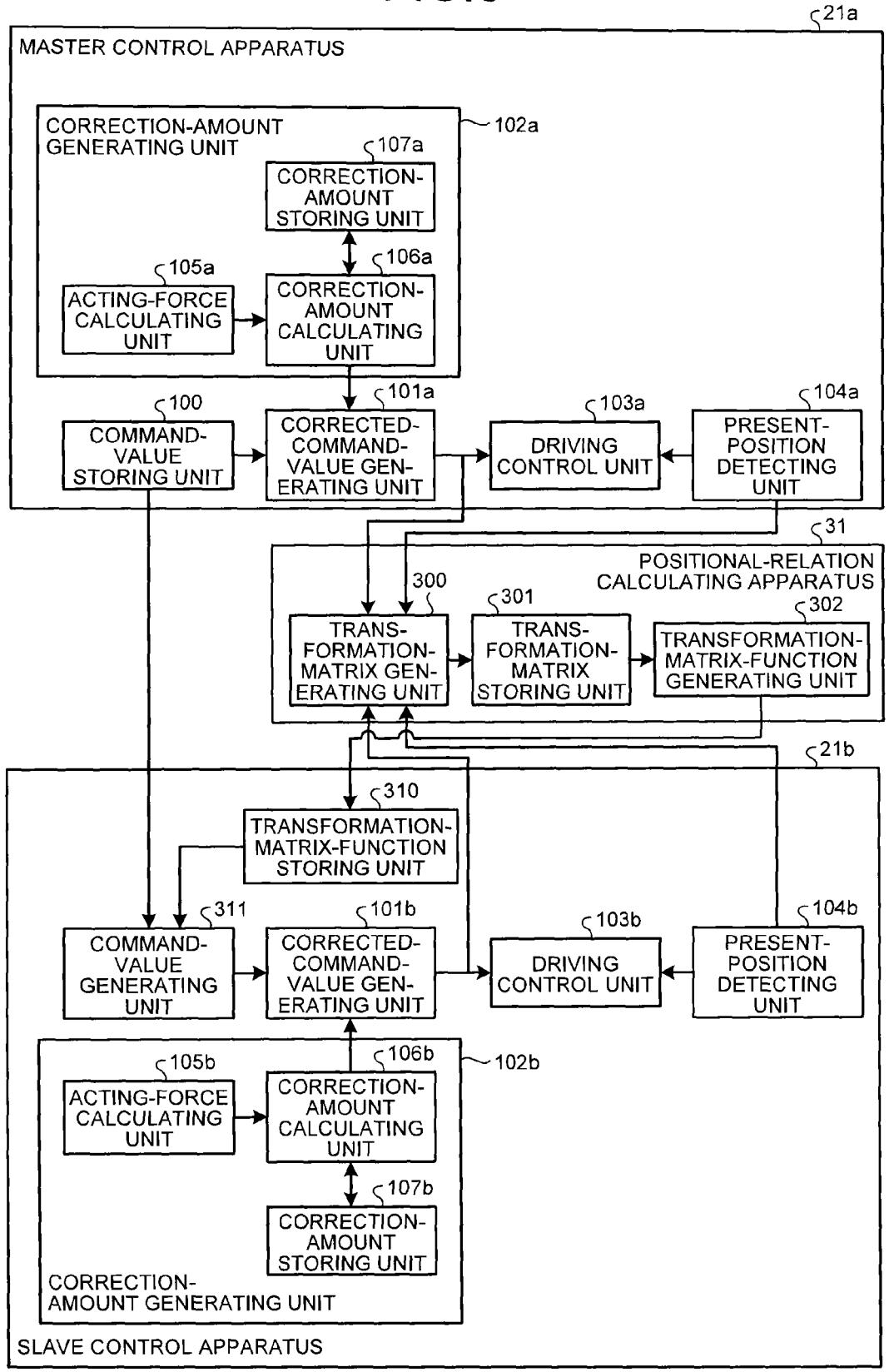
FIG. 8 is a diagram for explaining the configuration of a robot control system in a second embodiment.

According to the second embodiment, it is possible to also learn dynamically caused errors such as a shift of a finger position due to fluctuation in the temperature of a robot main body or an environmental temperature and a shift of a finger position due to a shift of synchronization timing during the operation of two or more robots and update a transformation matrix. FIG. 8 is a diagram for explaining a robot control system including a positional-relation calculating apparatus in the second embodiment of the present invention. Note that components same as the components in the first embodiment are denoted by reference numerals and signs same as the reference numerals and signs in the first embodiment and redundant explanation of the components is omitted.

As shown in FIG. 8, a master control apparatus 21a includes the command-value storing unit 100, the correction-amount generating unit 102a, the corrected-command-value generating unit 101a, the driving control unit 103a, and the present-position detecting unit 104a. The correction-amount generating unit 102a includes the acting-force calculating unit 105a, the correction-amount calculating unit 106a, and the correction-amount storing unit 107a. When a normal operation is performed, the master control apparatus 21a outputs the present position detected by the present-position detecting unit 104a to a positional-relation calculating apparatus 31.

The positional-relation calculating apparatus 31 includes a transformation-matrix generating unit 300, a transformation-matrix storing unit 301 that stores N transformation matrices for learning, and a transformation-matrix-function generating unit 302. The transformation-matrix generating unit 300, the transformation-matrix storing unit 301, and the transformation-matrix-function generating unit 302 execute processing same as the processing by the corresponding components in the first embodiment in the preparation processing and generate a transformation matrix function (a first transformation matrix function) in the first embodiment. During the normal operation, the transformation-matrix generating unit 300, the transformation-matrix storing unit 301, and the transformation-matrix-function generating unit 302 dynamically generate a transformation matrix function (a second transformation matrix function) on the basis of the respective present positions detected by the present-position detecting units 104a and 104b.

A slave control apparatus 21b includes a transformation-matrix-function storing unit 310, a command-value generating unit 311, the correction-amount generating unit 102b, the corrected-command-value generating unit 101b, the driving control unit 103b, and the present-position detecting unit 104b. The correction-amount generating unit 102b includes a configuration equivalent to the configuration of the correction-amount generating unit 102a.

Figure 9:
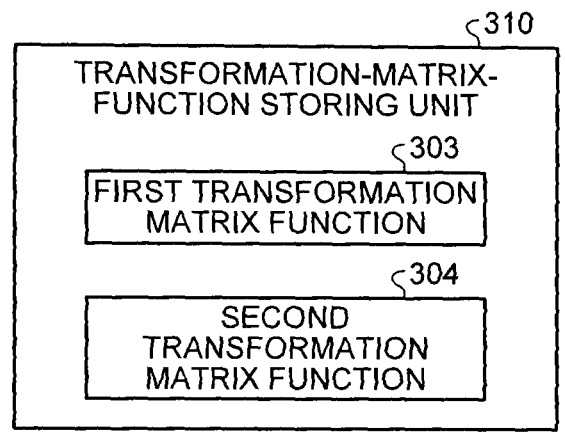
FIG. 9 is a diagram for explaining a memory configuration of a transformation-matrix-function storing unit in the second embodiment.

FIG. 9 is a diagram for explaining a memory configuration of the transformation-matrix-function storing unit 310. As shown in the figure, the transformation-matrix-function storing unit 310 stores a first transformation matrix function 303 and a second transformation matrix function 304 calculated by the positional-relation calculating apparatus 31. Note that the second transformation matrix function 304 stored by the transformation-matrix-function storing unit 310 is dynamically updated by the positional-relation calculating apparatus 31.

The command-value generating unit 311 can generate a Tm-th command value using the first transformation matrix function 303 and the second transformation matrix function 304.

A robot control method in the second embodiment of the present invention executed using the robot control system shown in FIG. 8 is explained. Note that preparation processing executed in offline is the same as the preparation processing in the first embodiment. Therefore, explanation of the preparation processing is omitted. The transformation matrix function generated by the preparation processing is stored in the transformation-matrix-function storing unit 310 as the first transformation matrix function 303.

A normal operation of the master control apparatus 21a is the same as the normal operation in the first embodiment except that the master control apparatus 21a outputs the present position detected by the present-position detecting unit 104a to the positional-relation calculating apparatus 31. Therefore, explanation of the normal operation is omitted. Note that, like the master control apparatus 21a, the slave control apparatus 21b outputs the present position detected by the present-position detecting unit 104b to the positional-relation calculating apparatus 31. For simplification, it is assumed that, every time the respective N command values nearest to a command value for learning among M command values are acquired by the corrected-command-value generating unit 101a and the command-value generating unit 311 from the command-value storing unit 100, the master control apparatus 21a and the slave control apparatus 21b output the present position to the positional-relation calculating apparatus 31. That is, the present-position detecting units 104a and 104b respectively output position detection values as new command value for learning every time the master robot 10a reaches a teaching point or a point nearest to the teaching point.

Figure 10:
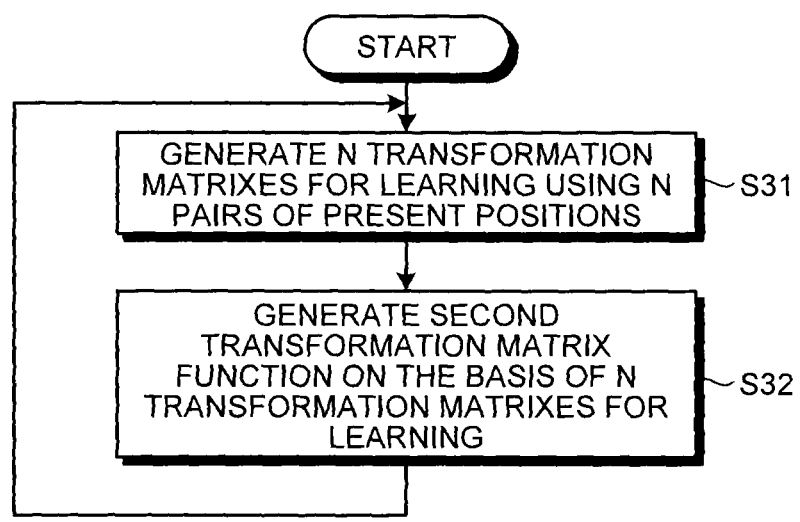
FIG. 10 is a flowchart for explaining an operation in which a positional-relation calculating apparatus in the second embodiment generates a second transformation matrix function.

FIG. 10 is a diagram for explaining an operation in which the positional-relation calculating apparatus 31 generates the second transformation matrix function 304. First, the transformation-matrix generating unit 300 generates N transformation matrices for learning using, as the command value for learning in the first embodiment, N pairs of present positions input from the master control apparatus 21a and the slave control apparatus 21b at every operation completion point of one cycle (step S31). Note that the transformation-matrix generating unit 300 stores the generated transformation matrices for learning in the transformation-matrix storing unit 301. Thereafter, the transformation-matrix-function generating unit 302 generates the second transformation matrix function 304 on the basis of the N transformation matrices for learning stored in the transformation-matrix storing unit 301 by the processing at step S31 (step S32). The generated second transformation matrix function 304 is transmitted to the slave control apparatus 21b. The second transformation matrix function 304 stored by the transformation-matrix-function storing unit 310 is overwritten with the transmitted second transformation matrix function 304. Thereafter, the processing at step S31 is executed.

Figure 11:
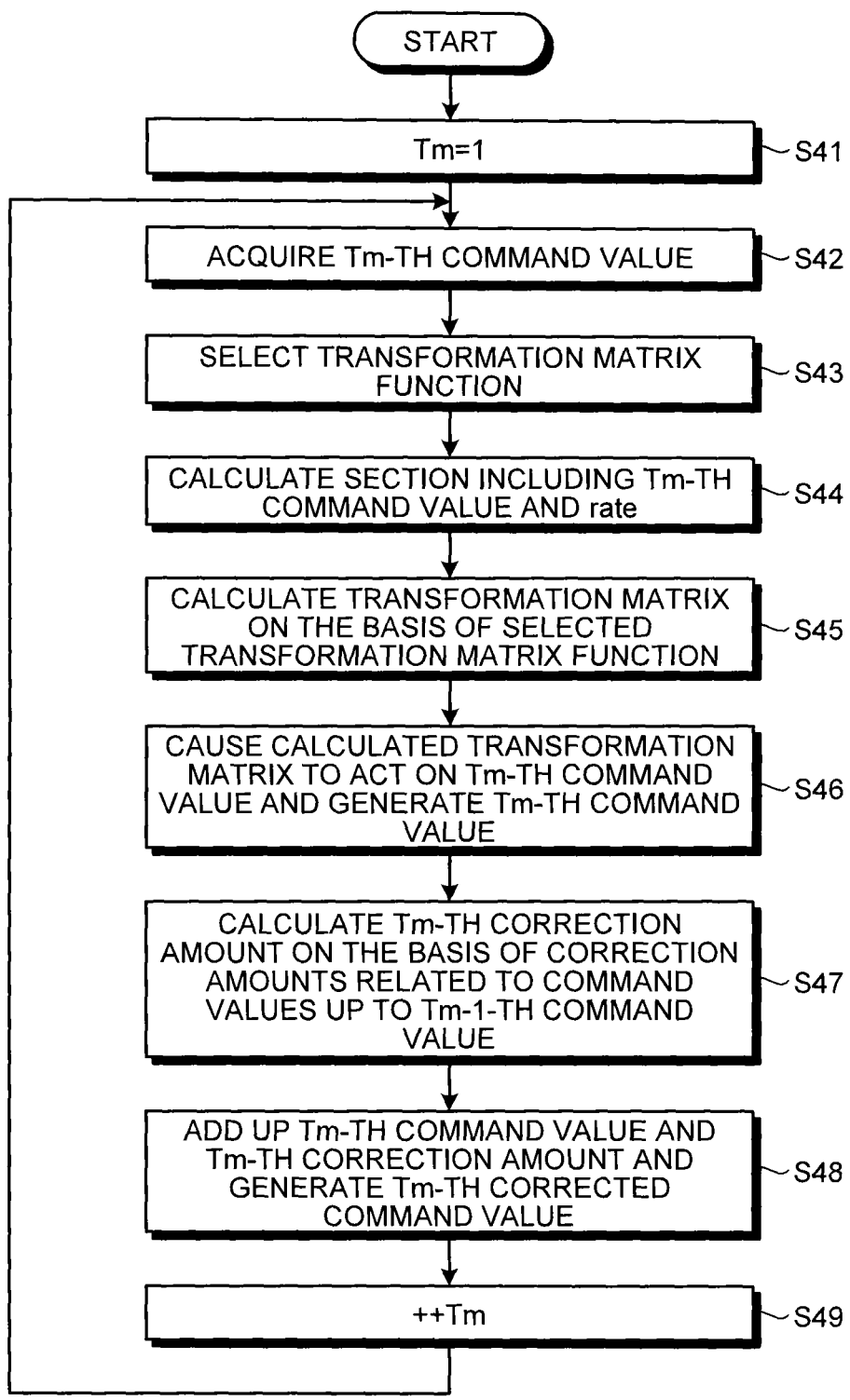
FIG. 11 is a flowchart for explaining an operation during automatic operation of a slave control apparatus in the second embodiment.

FIG. 11 is a flowchart for explaining a normal operation of the slave control apparatus 21b. In the slave control apparatus 21b, first, the command-value generating unit 311 initializes Tm with 1 (step S41) and extracts the Tm-th command value stored in the command-value storing unit 100 (step S42).

Subsequently, the command-value generating unit 311 selects a transformation matrix function to be used (step S43). The command-value generating unit 311 can execute the selection processing at step S43 on the basis of any standard. The second transformation matrix function 304 tends to converge as an elapsed time in the normal operation increases. However, when the convergence is insufficient, the command-value generating unit 311 may select the first transformation matrix function 303. The second transformation matrix function 304 is not generated immediately after the normal operation is started. Therefore, in that case, the command-value generating unit 311 can select the first transformation matrix function 303.

Subsequently, the command-value generating unit 311 calculates a section (a section represented by Pk, Pk+1) including the extracted Tm-th command value and rate(k, k+1,Tnow) (step S44). The command-value generating unit 311 calculates a transformation matrix $^{E1}T'_{E2}$(rate (k,k+1, Tnow)) on the basis of the selected transformation matrix function and Formulas 13 to 16 (step S45). The command-value generating unit 311 causes the calculated transformation matrix $^{E1}T'_{E2}$(rate (k,k+1,Tnow)) to act on the acquired Tm-th command value and generates a Tm-th command value for the end effector 11b (step S46). On the other hand, the correction-amount generating unit 102b calculates a Tm-th correction amount on the basis of correction amounts related to command values up to a Tm-1-th command value accumulated in the correction-amount storing unit 107b and an acting force measured by the acting-force calculating unit 105b (step S47). The corrected-command-value generating unit 101b adds up the generated Tm-th command value and the Tm-th correction amount and generates a Tm-th corrected command value (step S48). After step S48, the command-value generating unit 311 increments Tm by 1 (step S49) and executes the processing at step S42.

In this way, according to the second embodiment of the present invention, the master control apparatus 21a and the slave control apparatus 21b include command correcting units (the correction-amount generating units 102a and 102b and the corrected-command-value generating units 101a and 101b) that apply correction for reducing an acting force on fingers to a command value at each of operation periods of at least one of the master robot 10a and the slave robot 10b and the present-position detecting units 104a and 104b including a function of a position detecting unit that performs position detection for the robots 10a and 10b and a function of a position-corrected-command-value generating unit that outputs, as command values for learning, the position of the first robot and the position of the second robot detected at the respective N command values. Therefore, the master control apparatus 21a and the slave control apparatus 21b calculate a transformation matrix for learning while using, as a command value for learning, a position dynamically corrected to reduce an acting force applied to the fingers and sequentially updates the second transformation matrix function using the calculated transformation matrix for learning. Therefore, it is possible to correct respective finger positions until the acting force converges in a decreasing direction when the robots 10a and 10b carry out the cooperative operation, and is also made possible to cause the robots 10a and 10b to perform the cooperative operation on tracks on which the acting force finally becomes the smallest.

When a mode for continuing the update of the second transformation matrix function and a mode for stopping the update are provided, for example, it is possible to exclude, from learning, a trial including unnecessary disturbances (e.g., an increase in a load on the robots due to tangling of cables in the system) and not to carry out learning during actual production. By providing this configuration, it is possible to learn a slave track taking into account an error due to synchronization caused by a difference in a response of a motor in each posture in causing the robots to operate, a communication delay, and the like. Therefore, it is possible to learn a more accurate track of the slave robot.

Note that there is generally known, as a robot control method, an interpolation method for, when three or more command values are given by a user, approximately determining a track such that a track between an operation start position and an operation end position among command values passes near a command value located in the middle of the positions (see, for example, Patent Literature 3). According to this technology, a track calculated by a robot control apparatus on the basis of a command value given by the user does not always pass on the command value. According to the second embodiment, a transformation matrix can be dynamically generated. Therefore, even when such a technology is applied, it is possible to cause the robots 10a and 10b to perform the cooperative operation on tracks on which the acting force applied to the fingers decreases. However, in this case, concerning a command value output from the command-value storing unit of the master robot, a command value after interpolation processing in the case of the application of the interpolating method is input to the command-value generating unit 311 as the command value. In that case, in the transformation-matrix generating unit 300, as explained in the first embodiment, the slave robot also outputs a command value after the interpolation processing to the command corrected-command-value generating unit 101b using the command value of the slave robot acquired by the command-value generating unit 311 calculated using the data acquired during the teaching work. As a result, when the interpolation method is carried out, a transformation matrix obtained before an operation is different from a transformation matrix obtained when the interpolation method is not carried out.

When outputting the command value at each of the operation periods to the driving control unit 103a, the master control apparatus 21a can apply filter processing to the command value. When the filter processing is applied to the command value at each of the operation periods, a shift occurs between a position on a track on which the robot actually passes and an interpolated command value. In this case, the master control apparatus 21a sets the present position as a command value for learning. However, the slave control apparatus 21b outputs a command value after correction to the driving control unit 103b without applying the filter processing to the command value. Alternatively, the slave control apparatus 21b can approximately calculate a command value such that the command value after the filter processing is the present position.

Third Embodiment.

According to a third embodiment, a speed setting value during synchronous driving (which refers to override but can be a speed command value in a representative position) and a second transformation matrix function are recorded in association with each other. When a speed command value is changed from a recorded command value, a second transformation matrix function corresponding to the speed command value after the change is calculated on the basis of the second transformation matrix function recorded in advance. The calculated new second transformation matrix function is served for synchronous driving performed using a speed command value after update. Consequently, by experimentally executing automatic operation a plurality of times, while changing the speed setting value in advance, and causing the robot control apparatus to record the second transformation matrix function at each of speed setting values, in the following automatic operation, the user can cause the robot control apparatus to calculate, on the basis of the recorded second transformation matrix function, the second transformation matrix function used for the synchronous driving. Therefore, it is possible to stabilize control in a shorter time than the time consumed until the positional relation between the robots converges as in the second embodiment.

The second transformation matrix function at the time when the speed setting value is a zero value is represented as $^{E1}T'_{E2}(k,k+1)\text{ovrd}=0)$, the second transformation matrix at the time when the speed setting value is "a" is represented as $^{E1}T'_{E2}((k,k+1)\text{ovrd}=a)$, and the second transformation matrix function at the time when the speed setting value is "b" (b>a) is represented as $^{E1}T'_{E2}((k,k+1)\text{ovrd}=b)$. A method of calculating the second transformation matrix function applied during the normal operation in the slave control apparatus from the three second transformation matrix functions is explained. Note that the first transformation matrix function is equal to the second transformation matrix function $^{E1}T'_{E2}((k,k+1)\text{ovrd}=0)$ at the time when the speed setting value is the zero value.

An error between transformation matrices in shifting from a transformation matrix at Pk to a transformation matrix at Pk+1 is examined with reference to Formulas 7 and 14. An error $\Delta T(k,k+1,\text{ovrd}=a)$ of transformation at the time when the speed setting value is "a" can be described as indicated by the following formula:

$$\Delta T(k,k+1,\text{ovrd}=a)=[\Delta R(1)\_a, \Delta Pk\_a; \text{zero}(1,3),1] \qquad (17)$$

An error $\Delta T(k,k+1,\text{ovrd}=a)$ of transformation at the time when the speed setting value is "b" can be described as indicated by the following formula:

$$\Delta T(k,k+1,\text{ovrd}=a)=[\Delta R(1)\_b, \Delta Pk\_b; \text{zero}(1,3),1] \qquad (18)$$

If a transformation matrix for learning is unchanged by the speed change, an error occurs in the same manner even if the speed setting value is changed. Therefore, a transformation matrix function learned at any speed setting value can be used as it is in the slave control apparatus. However, when a finger position changes according to a speed change, for example, when there is the influence of responses of axes, the influence of a filter, or the like, a difference occurs between results of Formula 17 and Formula 18. This difference is examined.

First, concerning a difference between rotation amounts, when a rotation axis and a rotation amount of the one-axis rotation method corresponding to Formula 17 are represented as k_a and α_a and a rotation axis and a rotation amount of the one-axis rotation method corresponding to Formula 18 are represented as k_b and α_b, a rate of change Δα of the rotation amounts is represented as described below. Note that, assuming that an axis direction does not greatly change, the rotation axis at k_a is approximately adopted.

$$\Delta\alpha(x)=(\alpha b-\alpha a)/(b-a)*(x-a) \qquad (19)$$

$$\Delta P((k,k+1),x)\beta(\Delta Pk\_b-\Delta Pk\_a)/(b-a)*(x-a) \qquad (20)$$

When it is assumed that an error increases at a fixed rate as speed increases, by setting the second transformation matrix function at the time when the speed setting value is "a" as a reference using values obtained from Formulas 19 and 20, the slave control apparatus can calculate the second transformation matrix function for eliminating an error that occurs according to speed irrespective of with which speed setting value (override) the normal operation is performed.

Figure 12:
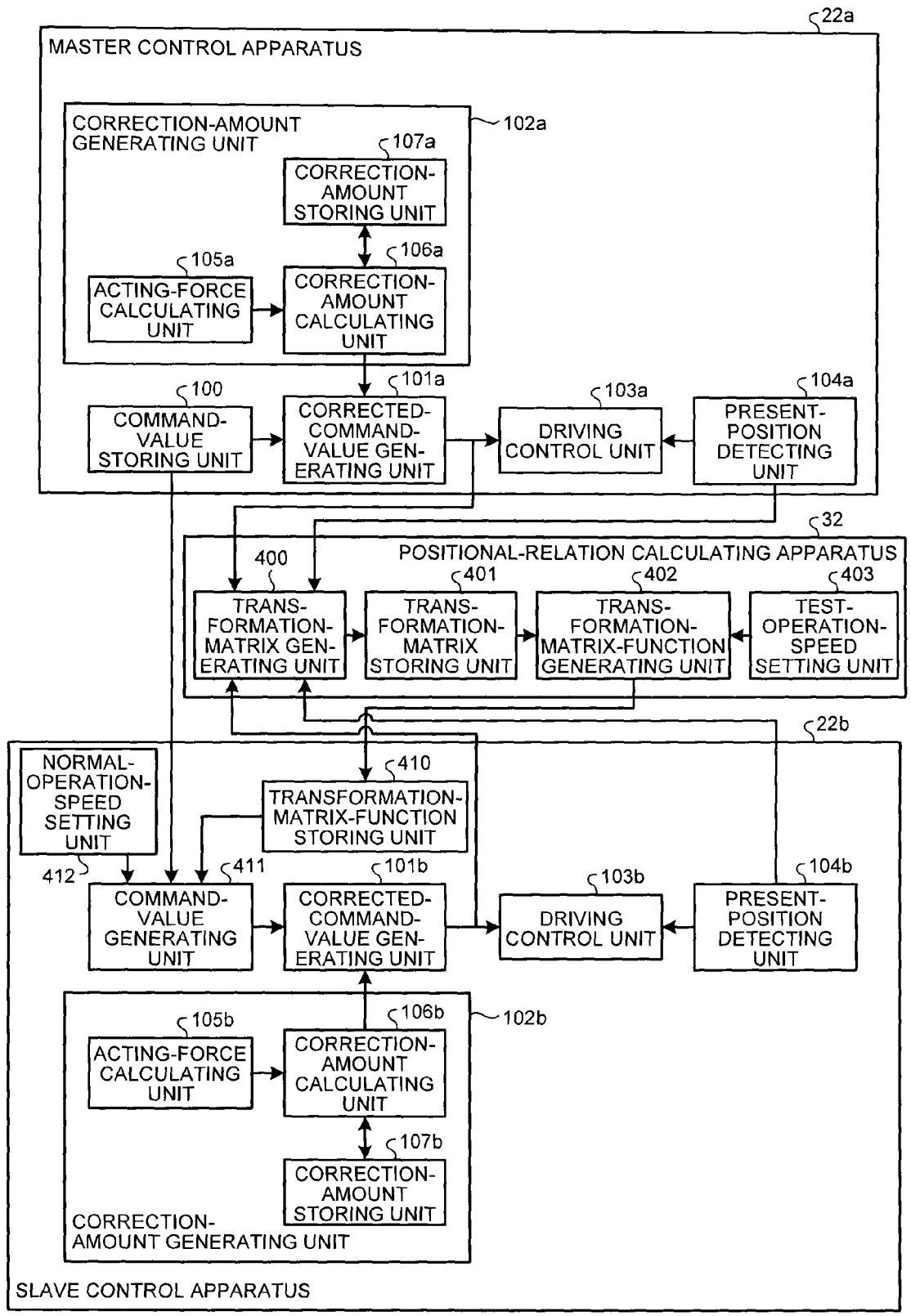
FIG. 12 is a diagram for explaining the configuration of a robot control system in a third embodiment.

FIG. 12 is a diagram for explaining the configuration of a robot control system in a third embodiment of the present invention. Note that components same as the components in the first embodiment are denoted by reference numerals and signs same as the reference numerals and signs in the first embodiment and redundant explanation of the components is omitted.

As shown in FIG. 12, a master control apparatus 22a includes the command-value storing unit 100, the correction-amount generating unit 102a, the corrected-command-value generating unit 101a, the driving control unit 103a, and the present-position detecting unit 104a. The correction-amount generating unit 102a includes the acting-force calculating unit 105a, the correction-amount calculating unit 106a, and the correction-amount storing unit 107a. When a test operation is performed, the master control apparatus 22a outputs the present position detected by the present-position detecting unit 104a to a positional-relation calculating apparatus 32.

The positional-relation calculating apparatus 32 includes a transformation-matrix generating unit 400, a transformation-matrix storing unit 401 that stores N transformation matrices for learning, and a transformation-matrix-function generating unit 402 and a test-operation-speed setting unit 403. The transformation-matrix generating unit 400, the transformation-matrix storing unit 401, and the transformation-matrix-function generating unit 402 execute processing same as the processing by the corresponding components in the first embodiment in the preparation processing and generate a transformation matrix function (the first transformation matrix function 303) in the first embodiment.

During the test operation, a test-operation-speed setting unit 403 receives an input of a speed setting value. The transformation-matrix generating unit 400, the transformation-matrix storing unit 401, and the transformation-matrix-function generating unit 402 dynamically generate a transformation matrix function (a second transformation matrix function) on the basis of the respective present positions detected by the present-position detecting units 104a and 104b and output the generated second transformation matrix function to a slave control apparatus 22b in association with the speed setting value input to the test-operation-speed setting unit 403. Note that a second transformation matrix function at each of speed setting values is denoted by reference numeral 404 to be distinguished from the second transformation matrix function 304 in the second embodiment.

The slave control apparatus 22b includes a transformation-matrix-function storing unit 410, a command-value generating unit 411, a normal-operation-speed setting unit 412, the correction-amount generating unit 102b, the corrected-command-value generating unit 101b, the driving control unit 103b, and the present-position detecting unit 104b. The correction-amount generating unit 102b includes a configuration equivalent to the configuration of the correction-amount generating unit 102a.

Figure 13:
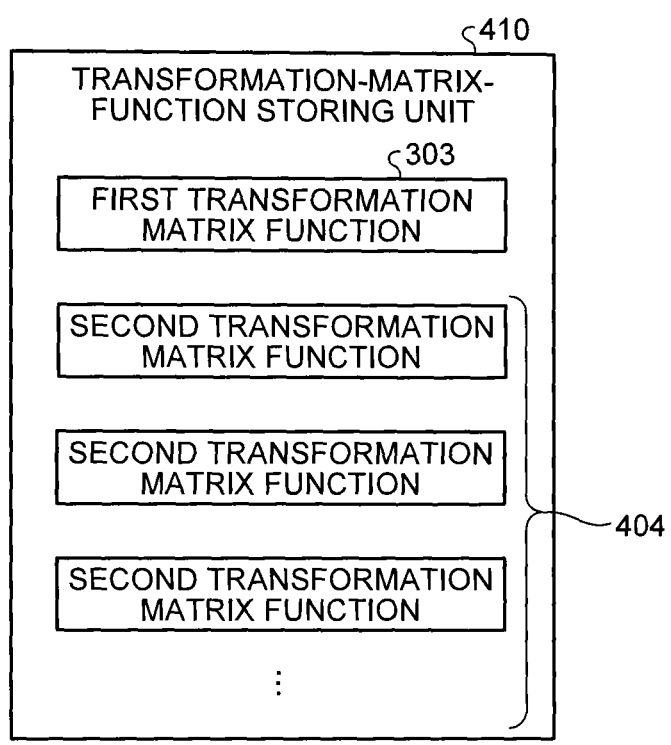
FIG. 13 is a diagram for explaining a memory configuration of a transformation-matrix-function storing unit in the third embodiment.

FIG. 13 is a diagram for explaining a memory configuration of the transformation-matrix-function storing unit 410. As shown in the figure, the transformation-matrix-function storing unit 410 stores the first transformation matrix function 303 and the second transformation matrix function 404 for each of speed setting values calculated by the positional-relation calculating apparatus 32.

The normal-operation-speed setting unit 412 receives an input of a speed setting value during the normal operation. The speed setting value input during the normal operation can be different from the speed setting value input during the test operation. The command-value generating unit 411 calculates a transformation matrix on the basis of the speed setting value acquired by the normal-operation-speed setting unit 412 and the second transformation matrix function 404

(and the first transformation matrix function 303) at each of the speed setting values stored in the transformation-matrix-function storing unit 410 while position-correcting an error corresponding to speed using Formulas 19 and 20. The command-value generating unit 411 causes the calculated transformation matrix to act on the Tm-th command value for the end effector 11a acquired from the command-value storing unit 100 and calculates a Tm-th command value for the end effector 11b.

In this way, according to the third embodiment of the present invention, the robot control apparatus includes the normal-operation-speed setting unit 412 functioning as a speed-setting-value input unit that receives an input of a speed setting value during the synchronous driving and the transformation-matrix-function storing unit 410 functioning as a positional-relation-matrix-function storing unit that stores the second transformation matrix function 404 at each of the speed setting values in advance. The command-value generating unit 411 is configured to read out the second transformation matrix function stored in the transformation-matrix-function storing unit 410, corrects the second transformation matrix function on the basis of the input speed setting value, and calculates a command value at each of operation periods related to the slave robot 10b using the second transformation matrix function after the correction. At the startup of the production system, when a speed setting value of the entire production system is gradually increased, it is possible to estimate an optimum positional relation between the robots 10a and 10b using information recorded in advance. Therefore, it is possible to further reduce a startup time than in the second embodiment.

Fourth Embodiment.

According to a fourth embodiment, the correction-amount generating units 102a and 102b carry out impedance control taking into account impedance characteristics. The impedance control is a method of introducing a model in which a spring damper is connected between a hand and an environment, defining desired impedance, and controlling a finger position. According to the fourth embodiment, the generation method for a correction amount by the correction-amount generating units 102a and 102b explained in the first embodiment is changed. However, effects same as the effects obtained by the first embodiment are obtained.

Further, according to the fourth embodiment, a dynamic relation with a work target can be specified by using the impedance control. Therefore, it is possible to carry out learning of a track in a state in which an overload state on the robots 10a and 10b or a workpiece is adjusted to less easily occur.

Fifth Embodiment.

In the robot control apparatus described in the first to third embodiments, the correction-amount generating units 102a and 102b can calculate a correction amount using distances measured by distance sensors instead of the acting force applied to the fingers. Specifically, distance sensors are attached to the robots 10a and 10b or jigs of the production system to measure distances between the robots and the workpiece and calculate a relative distance between finger positions of the robots 10a and 10b. When the relative distance deviates from a desired distance, a correction amount is generated to match the relative distance and the desired distance. Note that a method of calculating the relative distance between the robots 10a and 10b can be any method. For example, a relative distance between the robot 10a and the workpiece and a relative distance between the robot 10b and the workpiece can be measured by the distance sensors to calculate a distance between the robot 10a and the robot 10b. The distance between the robot 10a and the robot 10b can be directly measured by the distance sensors.

When the robots or peripheral driving apparatuses carry out a cooperative operation that requires work to be done in a non-contact manner while a fixed distance is maintained, by applying this configuration, it is possible to learn a track of the slave robot 10b that keeps an ideal positional relation with respect to a work target.

Sixth Embodiment.

With the robot control apparatuses described in the second, third, and fifth embodiments, the correction-amount generating units 102a and 102b proceed with learning making use of the correction amount that fluctuates in every trial even at the same teaching point. Therefore, a convergence property is sometimes not guaranteed. On the other hand, a robot control apparatus in a sixth embodiment is configured to calculate, with respect to the transformation matrix generated by the transformation-matrix generating unit 200, a transformation matrix uk+1 acquired at the k+1-th time, a transformation matrix u acquired at the k-th time, an amount of change g of the transformation matrices acquired at the k-th time and the k+1-th time, and a rate of change q(*) obtained by dividing the amount of change of the transformation matrices acquired at the k-th time and k+1-th time by the control cycle, and cause those transformation matrices uk+1 and u, the amount of change q, and the rate of change q(*) to stably converge using a learning control method with a forgetting factor (see Non Patent Literature 1) even when there is fluctuation in a calculated correction amount.

Seventh Embodiment.

In a seventh embodiment, a command value for learning is generated by adding an average of correction amounts for a plurality of cycles to respective N command values before position correction. Here, the command value for learning is referred to as first command value for learning. The command value before the position correction, to which the average of the correction amounts for the cycles is added to generate the first command value for learning, is referred to as a second command value for learning. Note that, in the second embodiment, as an example, a teaching point or a command value near the teaching point among M position command values for defining a command track of the end effector 11a at each of operation periods is used as the second command value for learning.

Figure 14:
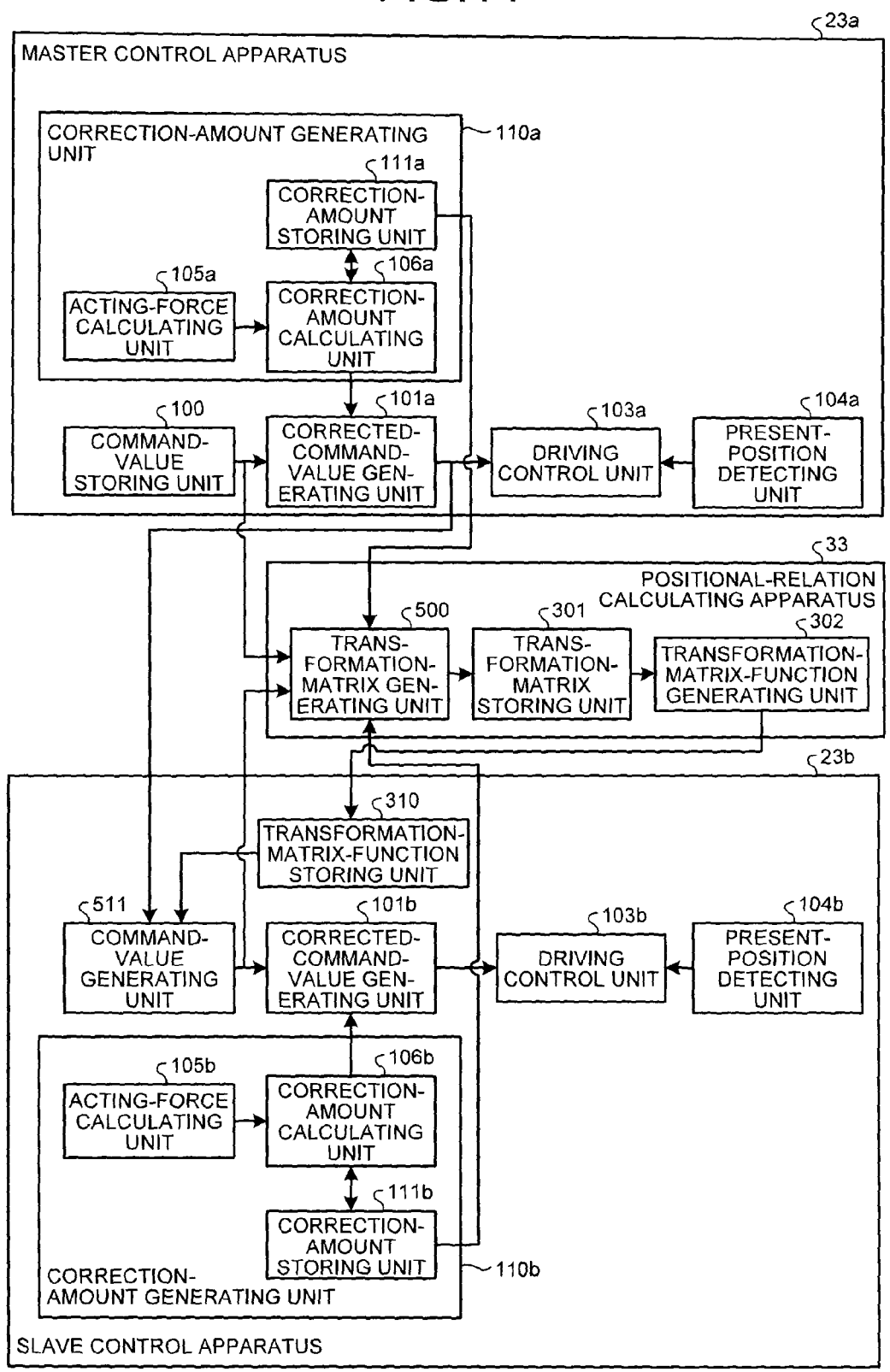
FIG. 14 is a diagram for explaining the configuration of a robot control system in a seventh embodiment.

FIG. 14 is a diagram for explaining a robot control system including a positional-relation calculating apparatus in the seventh embodiment of the present invention. Components same as the components in the first to third embodiments are denoted by reference numerals and signs same as the reference numerals and signs in the first to third embodiments and redundant explanation of the components is omitted.

As shown in FIG. 14, a master control apparatus 23a includes the command-value storing unit 100, a correction-amount generating unit 110a, the corrected-command-value generating unit 101a, the driving control unit 103a, and the present-position detecting unit 104a. The correction-amount generating unit 110a includes the acting-force calculating unit 105a, the correction-amount calculating unit 106a, and a correction-amount storing unit 111a. During automatic operation, the correction-amount storing unit 111a accumulates and stores R correction amounts calculated most lately concerning respective N command values. The correction-amount storing unit 111a also stores R correction amounts calculated most lately concerning respective M second command values for learning. Note that R is, for example, an integer equal to or larger than 2 set in advance. The R correction amounts related to the respective M second command values for learning are read out by a positional-relation calculating apparatus 33. A second command value for learning stored in the command-value storing unit 100 is read out by the positional-relation calculating apparatus 33. A corrected command value at each of operation periods generated by the corrected-command-value generating unit 101a is transmitted to a slave control apparatus 23b. The second command value for learning is transmitted to the slave control apparatus 23b after being corrected by the corrected-command-value generating unit 101a.

Note that the second command value for learning stored in the command-value storing unit 100 is referred to as second command value for learning for the end effector 11a to be distinguished from a second command value for learning for the end effector 11b explained below.

The positional-relation calculating apparatus 33 includes a transformation-matrix generating unit 500, the transformation-matrix storing unit 301, and the transformation-matrix-function generating unit 302. The transformation-matrix generating unit 500 generates N transformation matrices on the basis of N second command values for learning for the end effector 11a, N second command values for learning for the end effector 11b, an average of latest R sets of correction amounts calculated with respect to the N second command values for learning for the end effector 11a, and an average of latest R sets of correction amounts calculated with respect to the N second command values for learning for the end effector 11b. The transformation-matrix storing unit 301 stores the N transformation matrices for learning generated by the transformation-matrix generating unit 500. In the automatic operation, the transformation-matrix-function generating unit 302 dynamically generates a transformation matrix function (a second transformation matrix function) on the basis of the respective present positions detected by the present-position detecting units 104a and 104b.

Note that, in the preparation processing, the transformation-matrix-function generating unit 302 executes processing same as the processing by the corresponding component in the first embodiment and generates the transformation matrix function (the first transformation matrix function) in the first embodiment. To simplify explanation, explanation of a configuration for generating N transformation matrices in the preparation processing and illustration of an input and output relation of data are omitted.

The slave control apparatus 23b includes the transformation-matrix-function storing unit 310, a command-value generating unit 511, a correction-amount generating unit 110b, the corrected-command-value generating unit 101b, the driving control unit 103b, and the present-position detecting unit 104b.

The command-value generating unit 511 generates M command values for defining a track of the end effector 11b on the basis of the corrected command value at each of the operation periods transmitted from the corrected-command-value generating unit 101a and the second transformation matrix function 304 stored by the transformation-matrix-function storing unit 310. Specifically, the command-value generating unit 511 generates a transformation matrix at each of corrected command values for the end effector 11a on the basis of the second transformation matrix function 304. The command-value generating unit 511 causes the generated transformation matrix to act on the corrected command value at each of the operation periods transmitted from the corrected-command-value generating unit 101a and generates a command value for the end effector 11b at each of the operation periods. The command-value generating unit 511 generates a second command value for learning for the end effector 11b on the basis of the second command value for learning corrected by the corrected-command-value generating unit 101a and the second transformation matrix function 304. The command-value generating unit 511 transmits the generated second command value for learning for the end effector 11b to the positional-relation calculating apparatus 33.

The correction-amount generating unit 110b includes the acting-force calculating unit 105b, the correction-amount calculating unit 106b, and a correction-amount storing unit 111b. The correction-amount storing unit 111b accumulates and stores, concerning the respective M command values generated by the command-value generating unit 511, a predetermined number of (R) correction amounts most latterly calculated. Among the M command values generated by the command-value generating unit 511, a command value for the end effector 11b corresponding to the second command value for learning for the end effector 11a is transmitted to the positional-relation calculating apparatus 33. Note that the command value for the end effector 11b corresponding to the second command value for learning for the end effector 11a is referred to as second command value for learning for the end effector 11b.

A method with which the transformation-matrix generating unit 500 generates a transformation matrix for learning is explained. A component of a correction amount in $^{rob1}T'_{E1}$ is defined as $\Delta T_{k1}$ and a component of a correction amount in $^{rob2}T'_{E2}$ is defined as $\Delta T_{k2}$. That is, $\Delta T_{k1}$ is a difference between $^{rob1}T'_{E1}$ and $^{rob1}T_{E1}$ and $\Delta T_{k2}$ is a difference between $^{rob2}T'_{E}2$ and $^{rob2}T_{E2}$. Therefore, $\Delta T_{k1}$ and $\Delta T_{k2}$ can be respectively represented as follows:

$$\Delta T_{k1} = [^{rob1}R'_{E1}(^{rob1}R_{E1})^{-1}, ^{rob1}P'_{E1} - ^{rob1}P_{E1}; \text{zero}(1,3), 1] \tag{21}$$

$$\Delta T_{k2} = [^{rob2}R'_{E1}(^{rob2}R_{E2})^{-1}, ^{rob2}P'_{E2} - ^{rob2}P_{E}; \text{zero}(1,3), 1] \tag{22}$$

As in Formula (1), $^{rob1}T_{E1}$, $^{rob2}T_{E2}$, $^{rob1}T'_{E1}$, and $^{rob2}T'_{E2}$ are represented as follows:

$$^{robi}T'_{Ei}(i=1,2) = [^{rob1}R'_{Ei}, ^{rob1}P'_{Ei}; \text{zero}(1,3), 1] \tag{23}$$

$$^{robi}T_{Ei}(i=1,2) = [^{rob1}R_{Ei}, ^{rob1}P_{Ei}; \text{zero}(1,3), 1] \tag{24}$$

The transformation-matrix generating unit 500 calculates an average of the R correction amounts concerning the respective second command values for learning for the end effector 11a to thereby calculate an average $\Delta T_{k1\_m}$ of correction amounts for the respective second command values for learning for the end effector 11a. The transformation-matrix generating unit 500 calculates an average of the R correction amounts concerning the respective second command values for learning for the end effector 11b to thereby calculate an average $\Delta T_{k2\_m}$ of correction amounts for the respective second command values for learning for the end effector 11b. The transformation-matrix generating unit 500 adds the calculated average $\Delta T_{k1\_m}$ (i=1 and 2) to the corresponding second command value for learning to thereby calculate a first command value for learning.

Specifically, the transformation-matrix generating unit 500 calculates a rotation component $\Delta R_{ki\_m}$ and a translation component $\Delta P_{ki\_m}$ by using $\Delta T_{ki\_m}$ (1=1 and 2) and the following Formula (25):

$$\Delta T_{ki\_m} = [\Delta R_{ki\_m}, \Delta P_{ki\_m}; \text{zero}(1,3), 1] \tag{25}$$

The transformation-matrix generating unit 500 substitutes the rotation component $\Delta R_{ki\_m}$ and the translation component $\Delta P_{ki\_m}$ in Formula (26) to thereby calculate a first command value for learning $^{robi}T''_{Ei, \, i=1, \, 2}$:

$$^{robi}T''_{Ei, \, i=1, \, 2} = [^{robi}R_{Ei, \, i=1, \, 2}\Delta R_{ki\_m}, {}^{robi}P_{Ei, \, i=1, \, 2} + \Delta P_{ki\_m}; \, \text{zero}(1,3), 1] \quad (26)$$

The transformation-matrix generating unit 500 calculates a transformation matrix for learning $^{E1}T''_{E2})(k)$, k=1, 2, ..., N in the seventh embodiment using the first command value for learning $^{robi}T''_{Ei, \, i=1, \, 2}$ and the following Formula (27):

$$^{E1}T''_{E2} = ({}^{wld}T_{rob1}{}^{rob1}T''_{E1})^{-1} \, {}^{wld}T_{rob2}{}^{rob2}T''_{E2} \quad (27)$$

Note that, in the above explanation, the first command value for learning is calculated by adding the average of the latest R correction amount to the second command value for learning. However, a correction amount added to the second command value for learning only has to be a value representing the R correction amounts and is not limited to the average. For example, a median, a mode, and a weighted average of the R correction amounts can be adopted as the correction amount added to the second command value for learning.

The correction-amount calculating units 106a and 106b include, for example, a control system of an impedance control system or a force control system. The impedance control system or a force control system includes an integrator as indicated by Patent Literature 4. Therefore, the impedance control system or the power control system calculates an Tm-th correction amount using a T1-th correction amount to a Tm-1-th correction amount. According to the seventh embodiment, adjustment of an error is executed using R Tm-th correction amounts. Therefore, accuracy of the adjustment of the error is improved. As a result, it is possible to further reduce a load applied to a gripped work in any position on actual tracks of a plurality of robots in synchronous driving.

An acting force during the automatic operation changes because of conditions such as speed and temperature. According to the seventh embodiment, the first command value for learning is generated using the correction amount obtained by averaging the R correction amounts calculated most lately. Therefore, it is possible to asymptotically reduce the acting force that changes because of the conditions.

As explained above, according to the seventh embodiment of the present invention, the corrected-command-value generating units 101a and 101b, the correction-amount generating units 110a and 110b, and the transformation-matrix generating unit 500 cooperate with one another and calculate, concerning respective second command values for learning included in command values at each of operation periods, first command values for learning on the basis of the second command values for learning and a representative value of latest correction amounts for a predetermined cycle for the second command values for learning. The transformation-matrix generating unit 500 generates a transformation matrix for learning for the respective first command values for learning. Consequently, the first command values for learning are generated with an error adjusted by a method having higher accuracy compared with a system for calculating a Tm-th correction amount using a T1-th correction amount to a Tm-1-th correction amount. The first command values for learning are generated taking into account fluctuation in an error based on fluctuation in conditions during the automatic operation. Therefore, it is possible to reduce an acting force generated in the end effectors 11a and 11b as much as possible.

Note that, in the above explanation, the second transformation matrix function 304 is generated using the latest correction values for the R cycles calculated during the automatic operation. When the preparation processing for the R cycles is executed, the first transformation matrix function 303 can be generated by a procedure same as the procedure for the second transformation matrix function 304 using a correction value obtained by the preparation processing for the R cycles.

Figure 15:
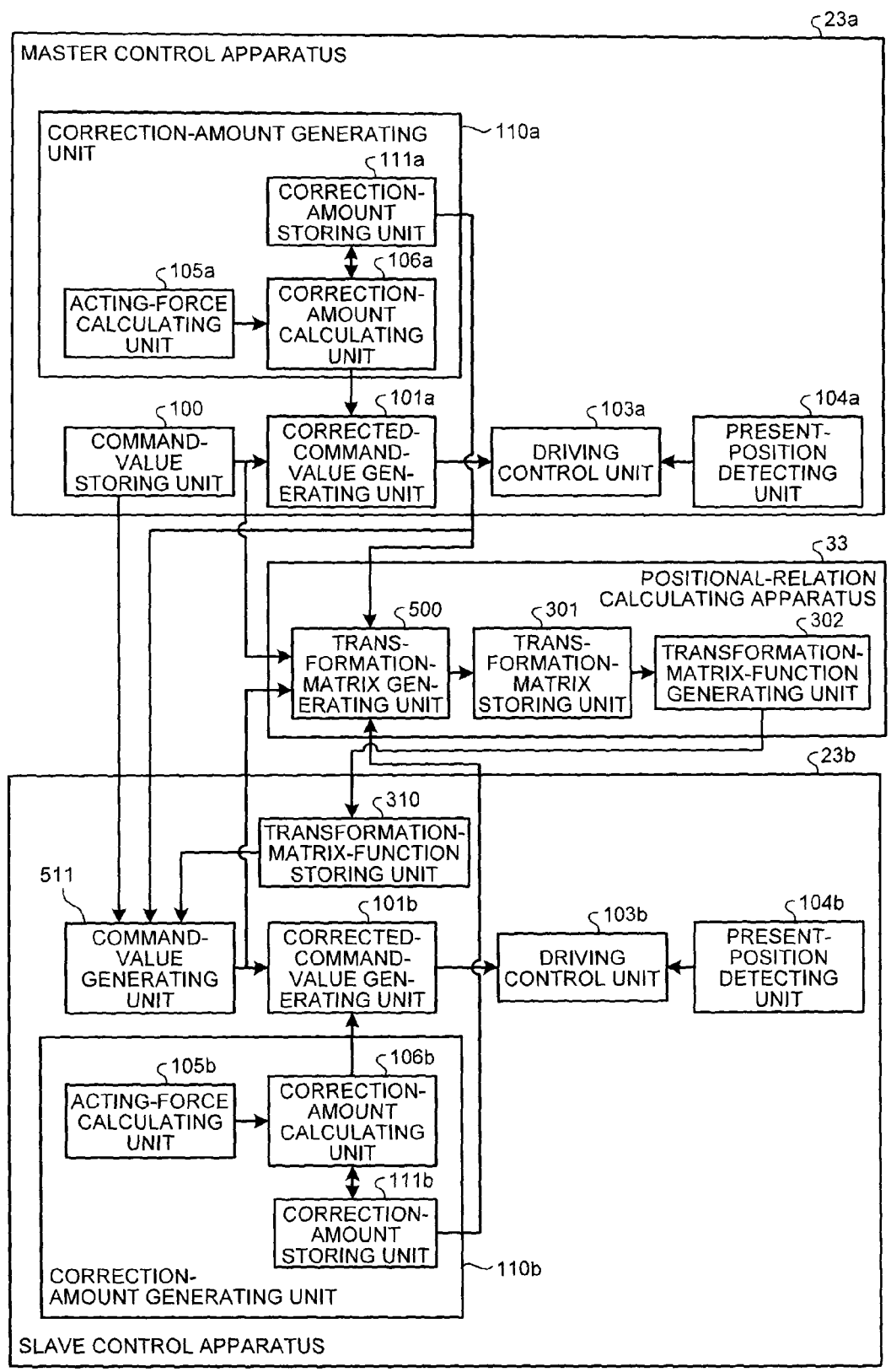
FIG. 15 is a diagram for explaining another configuration of the robot control system in the seventh embodiment.

As shown in FIG. 15, the command-value generating unit 511 may read out a command value at each of the operation periods for the end effector 11a from the command-value storing unit 100, read out R sets of correction amounts for the command value at each of the operation periods from the correction-amount storing unit 111a, and add up the read-out command value and an average of the read-out R sets of correction amounts to thereby generate a command value at each of the operation periods for the end effector 11b. Consequently, even if a corrected command value of the end effector 11a greatly fluctuates, it is possible to reduce the influence of the fluctuation in the corrected command value of the end effector 11a on the command value at each of the operation periods of the end effector 11b.

Eighth Embodiment.

In an eighth embodiment, a command value satisfying a predetermined condition concerning an acting force among command values at each of operation periods is selected as a second command value for learning.

Figure 16:
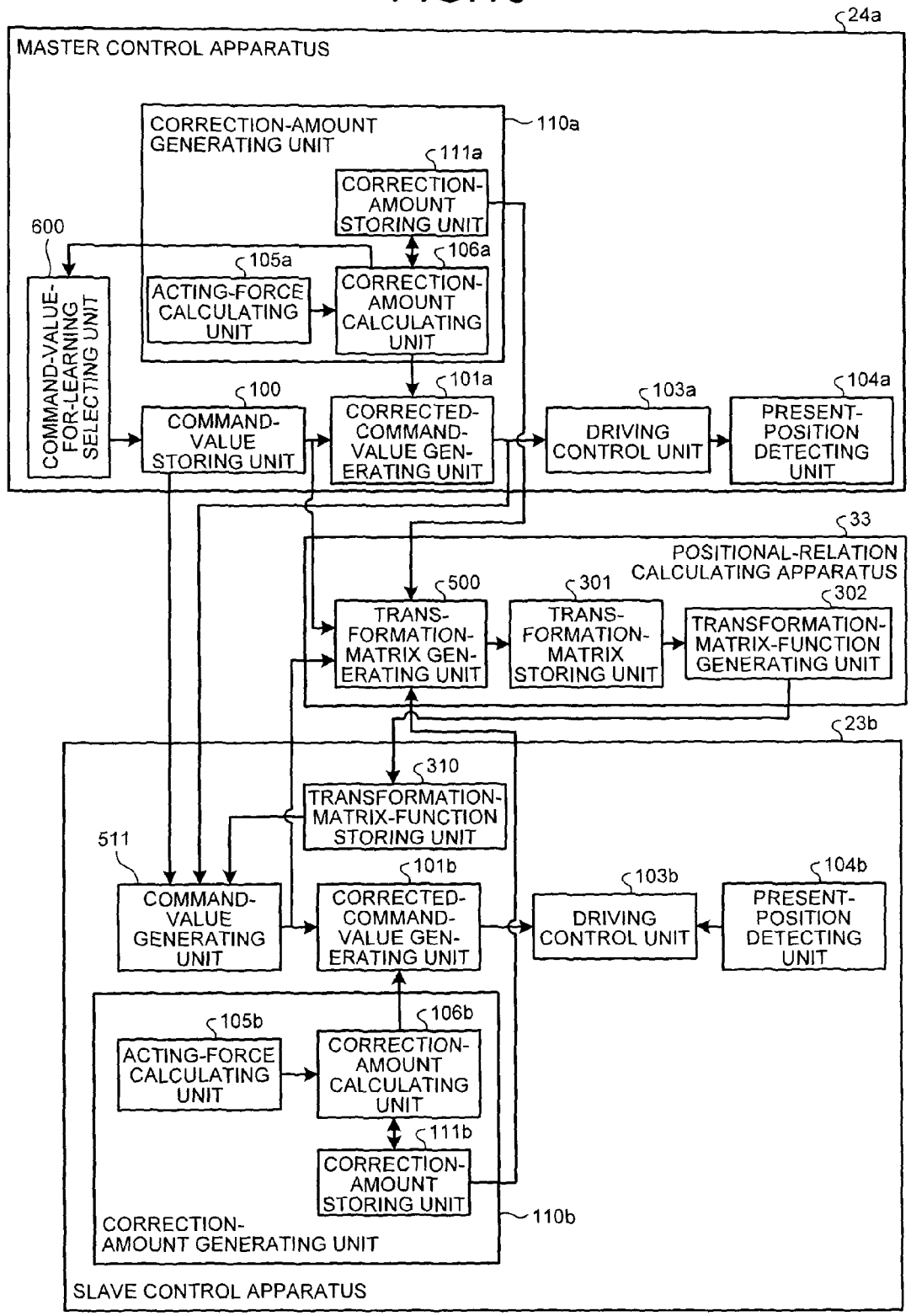
FIG. 16 is a diagram for explaining the configuration of a robot control system in an eighth embodiment.

FIG. 16 is a diagram for explaining a robot control system including a positional-relation calculating apparatus in the eighth embodiment of the present invention. Components same as the components in the seventh embodiment are denoted by reference numerals and signs same as the reference numerals and signs in the seventh embodiment and redundant explanation of the components is omitted.

As shown in the figure, a master control apparatus 24a in the eighth embodiment includes a configuration in which a command-value-for-learning selecting unit 600 is added to the master control apparatus 23a in the seventh embodiment explained with reference to FIG. 14. The positional-relation calculating apparatus 33 and the slave control apparatus 23b in the eighth embodiment respectively include configurations same as the configurations of the corresponding apparatuses explained with reference to FIG. 14.

The command-value-for-learning selecting unit 600 selects N second command values for learning satisfying a predetermined condition for an acting force out of M command values at each of the operation periods stored by the command-value storing unit 100. A correction amount increases and decreases according to an increase and a decrease in the acing force. The command-value-for-learning selecting unit 600 selects the N command values for learning using, as a feature value, a correction amount calculated by the correction-amount calculating unit 106a.

Note that the command-value-for-learning selecting unit 600 can select a second command value for learning using the correction amount in any way. For example, the command-value-for-learning selecting unit 600 can select a command value, any one of a correction amount and a rate of change of the correction amount or both of which exceed predetermined thresholds, as the second command value for learning. Consequently, a command value, with which an acting force or a rate of change of the acting force is particularly large, is set as the second command value for learning.

The command-value-for-learning selecting unit 600 can select the second command value for learning using an amount other than the correction amount as the feature value. A method of selecting the second command value for learning using an amount other than the correction amount as the feature value is explained below.

For example, the command-value-for-learning selecting unit 600 can use, as the feature value, an acting force calculated by the acting-force calculating unit 105a. The command-value-for-learning selecting unit 600 selects a command value, with which any one of an acting force and a rate of change of the acting force or both exceed predetermined thresholds, as the second command value for learning.

The command-value-for-learning selecting unit 600 can use a command value at each of the operation periods as the feature value. For example, the command-value-for-learning selecting unit 600 selects a command value satisfying a predetermined position condition as the second command value for learning. In some case, a position where an acting force or a rate of change of the acting force increases on a track is found in advance on the basis of a mechanism of a robot. In that case, the position where the acting force or the rate of change of the acting force increases on the track is set in the command-value-for- learning selecting unit 600 as a position condition in advance. The command-value-for-learning selecting unit 600 selects, as the second command value for learning, a command value for positioning the robot in the position set as the position condition. Note that a range on the track can be set as the position condition.

The command-value-for-learning selecting unit 600 can calculate motor speed from a command value at each of the operation periods or a present position at each of the operation periods and use the motor speed as the feature value. The command-value-for-learning selecting unit 600 detects a position where the motor speed or a rate of change of the motor speed is large and selects, as the second command value for learning, a command value for positioning the robot in the detected position. Consequently, a command value corresponding to a position where an acting force is increased by a centrifugal force or a Coriolis force on the track is selected as the second command value for learning.

The command-value-for-learning selecting unit 600 can use, as the feature value, an amount of change per unit time of a command value or a posture position.

The command-value-for-learning selecting unit 600 can use, as the feature value, time when the command value is used. A command value at each of the operation periods is sequentially read out from the command-value storing unit 100. A corrected command value based on the read-out command value is sequentially supplied to the driving control unit 103a. When an acting force fluctuates on the basis of a temporal condition, the command-value-for-learning selecting unit 600 can select the second command value for learning on the basis of the time when the acting force or fluctuation in the acting force increases. For example, when the time at which the command value at each of the operation periods is read out from the command-value storing unit 100 satisfies a time condition set in advance, the command-value-for-learning selecting unit 600 selects the command value as the second command value for learning.

Note that, when a correction amount is calculated on the basis of a distance as explained in the fifth embodiment, the command-value-for-learning selecting unit 600 can select the second command value for learning on the basis of comparison of the magnitude of the correction amount, a rate of change of the correction amount, or a difference between distances before and after correction, and a predetermined threshold.

The command-value-for-learning selecting unit 600 can combine the selection methods explained above and select the second command value for learning.

Figure 17:
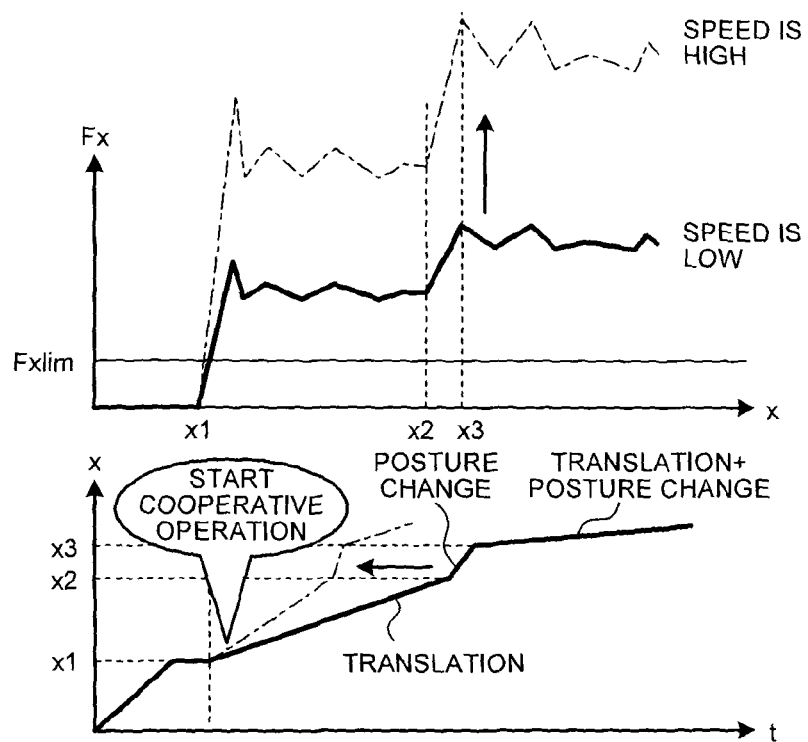
FIG. 17 is a diagram of a relation between an acting force applied to an end effector and the position of the end effector in the robot control system according to the comparative example.

FIG. 17 is a diagram of a relation between an acting force applied to an end effector and the position of the end effector in a cooperative work performed by the robot control system according to the comparative example. In the figure, t[s] indicates time, x[mm] indicates the position of the end effector, Fx[N] indicates the acting force applied to the end effector, and Fxlim[N] indicates an allowable value of the acting force. As shown in the figure, according to the comparative example, an error changes according to a change in the position of the end effector. The acting force Fx increase according to the error. When an error amount changes because of a dynamic influence, for example, when speed increases, the acting force Fx further increases.

Figure 18:
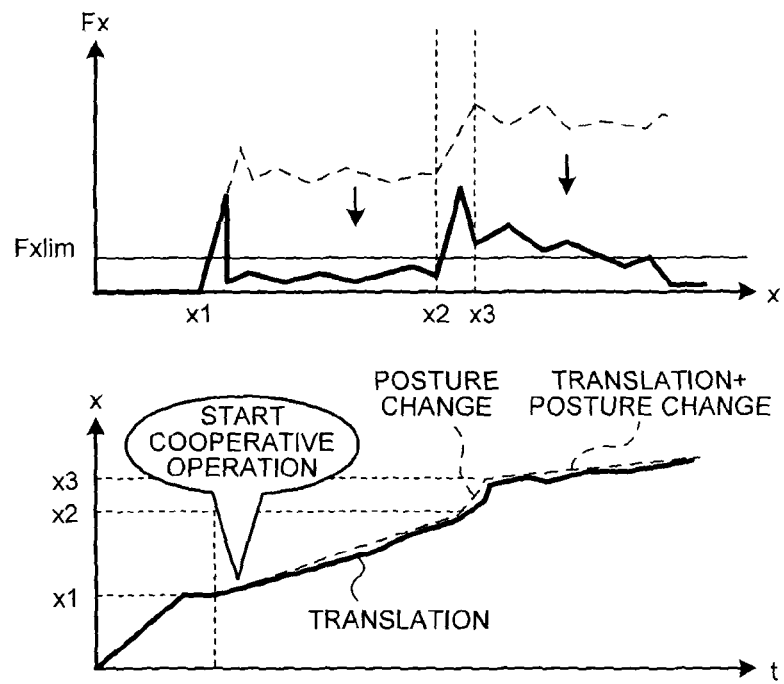
FIG. 18 is a diagram of a relation between an acting force applied to the end effector and the position of the end effector in impedance control applied to the robot control system according to the comparative example.

FIG. 18 is a diagram of a relation between an acting force applied to the end effector and the position of the end effector in impedance control applied to the robot control system according to the comparative example. According to the application of the impedance control, the acting force Fx in respective positions is reduced compared with the acting force Fx shown in FIG. 17. However, because it is difficult to adjust a control parameter for each of parts on a track, for example, when a posture changes or when speed fluctuates, it is difficult to reduce the acting force Fx to be smaller than Fxlin in all positions on the track.

Figure 19:
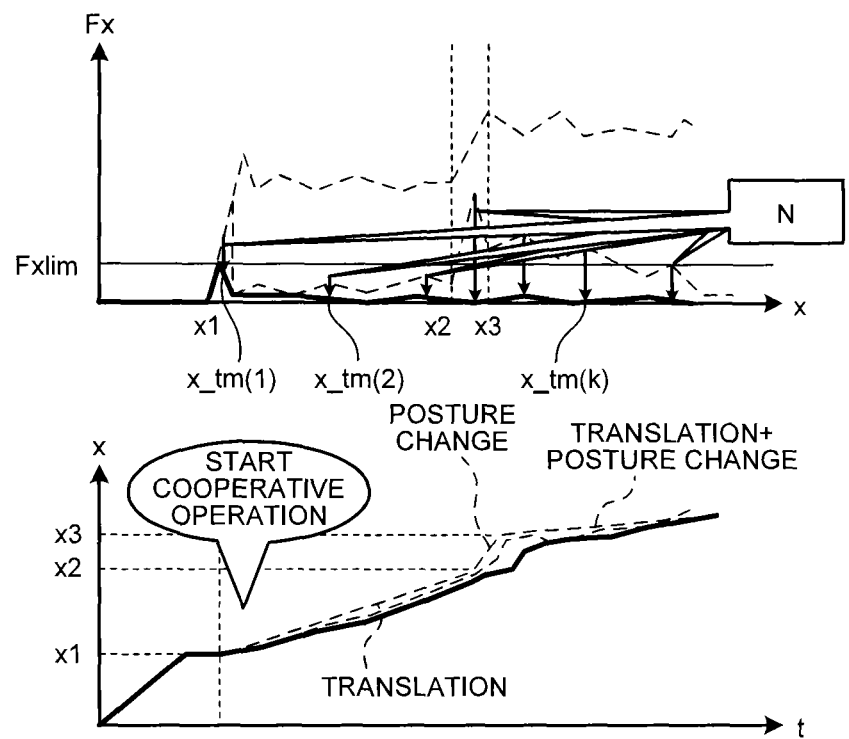
FIG. 19 is a diagram of a relation between an acting force applied to an end effector and the position of the end effector in the robot control system in the eighth embodiment.

FIG. 19 is a diagram of a relation between an acting force applied to an end effector and the position of the end effector in cooperative work performed by the robot control system in the eighth embodiment. According to the eighth embodiment, a command value for positioning the robot in a position where an acting force or a rate of change of the acting force is large is selected as a second command value for learning An average of R correction values is added to respective second command values for learning to generate a first command value for learning. Consequently, it is possible to reduce the acting force Fx over the entire area on the track. As a result, it is possible to reduce the acting force Fx to be smaller than Fxlim in any position on the track.

As explained above, according to the eighth embodiment of the present invention, the command-value-for-learning selecting unit 600 selects the N second command values for learning satisfying the predetermined condition concerning an acting force out of the M command values at each of the operation periods for the end effector 11a stored by the command-value storing unit 100. The command-value generating unit 511 generates a second command value for learning for the end effector 11b on the basis of the selected second command value for learning for the end effector 11a. Consequently, a transformation matrix for learning is generated such that the acting force decreases in positions where an acting force generated in the end effectors 11a and 11b or a rate of change of the acting force is particularly large. Therefore, it is possible to further reduce the acting force generated in the end effectors 11a and 11b.

Note that, in the explanation in the first to seventh embodiments, the type of the robots 10a and 10b is the six-degree-of-freedom vertical multi-joint robot. However, the type of the robots 10a and 10b is not limited to this. The type of the robots 10a and 10b can be, for example, a horizontal multi-joint robot or a linear motion robot.

INDUSTRIAL APPLICABILITY

As explained above, the robot control apparatus and the robot control method according to the present invention is suitably applied to a robot control apparatus and a robot control method for driving a plurality of robots while synchronizing the robots with one another.

REFERENCE SIGNS LIST

10a Master robot
10b Slave robot
11a, b End effectors
12a, b Installation stands
20a, 21a, 22a, 23a, 24a, 40a Master control apparatuses
20b, 21b, 22b, 23b, 40b Slave control apparatuses
30, 31, 32, 33, 50 Positional-relation calculating apparatuses
100 Command-value storing unit
101a, b Corrected-command-value generating units
102a, b Correction-amount generating units
103a, b Driving control units
104a, b Present-position detecting units
105a, b Acting-force calculating units
106a, b Correction-amount calculating units
107a, b Correction-amount storing units
108, 311, 511 Command-value generating units
109 Transformation-matrix storing unit
110a, b Correction-amount generating units
111a, b Correction-amount storing units
200, 300, 400, 500 Transformation-matrix generating units
201, 301, 401 Transformation-matrix storing units
202, 302, 402 Transformation-matrix-function generating units
210, 310 Transformation-matrix-function storing units
211 Command-value generating unit
303 First transformation matrix function
304, 404 Second transformation matrix functions
403 Test-operation-speed setting unit
410 Transformation-matrix-function storing unit
411 Command-value generating unit
412 Normal-operation-speed setting unit
600 Command-value-for-learning selecting unit

The invention claimed is:

1. A robot control apparatus that synchronously drives a first robot and a second robot different from the first robot, the robot control apparatus comprising:
a positional-relation-matrix generating unit that generates, on the basis of N first command values for learning per one robot, which are position-corrected command values for positioning the first robot and the second robot on tracks of the first robot and the second robot during the synchronous driving, concerning the respective N first command values for learning, positional relation matrices for defining a positional relation during the synchronous driving between a first command value for learning related to the first robot and a first command value for learning related to the second robot;
a first command-value output unit that outputs a first command value for driving at each of M (M>N) operation periods, which is a command value for defining the track of the first robot;
a positional-relation-matrix interpolating unit that interpolates the N positional relation matrices and generates a positional relation matrix at the each first command value for driving; and
a second command-value generating unit that causes the positional relation matrices corresponding to the M first command values for driving after the interpolation to act on the respective M first command values for driving and generates M second command values for driving, which are command values for defining the track of the second robot, wherein
the robot control apparatus drives the first robot on the basis of the first command values for driving and drives the second robot on the basis of the second command values for driving.

2. The robot control apparatus according to claim 1, wherein
the first robot and the second robot are caused to move to and stand still at respective N sets of teaching points by a user, and
the robot control apparatus further comprises a position-corrected-command-value generating unit that performs correction of respective finger positions on the basis of an acting force applied to fingers every time the first robot and the second robot are caused to stand still at the respective N sets of teaching points, acquires finger positions after the correction or command values corresponding to the finger positions after the correction, and sets the finger positions or the command values in the first command values for learning.

3. The robot control apparatus according to claim 2, further comprising a positional-relation-matrix-function generating unit that generates a positional relation matrix function for interpolating the N positional relation matrices, wherein
the positional-relation-matrix interpolating unit generates a positional relation matrix at each of the first command values for driving on the basis of the positional relation matrix function.

4. The robot control apparatus according to claim 1, wherein,
the first robot and the second robot are robots that simultaneously grip and convey a same work, and
the robot control apparatus further comprises:
an acting-force calculating unit that calculates an acting force applied to the finger of the first robot or the second robot;
a command correcting unit that applies, during the synchronous driving, to the first command values for driving or the second command values for driving, correction for reducing the acting force applied to the finger of the first robot or the second robot on the basis of a calculated value of the acting-force calculating unit;
a position detecting unit that performs position detection for the first robot and the second robot during the synchronous driving; and
a position-corrected-command-value generating unit configured to calculate the N first command values for learning for each of the robots during the synchronous driving.

5. The robot control apparatus according to claim 4, further comprising a position detecting unit that detects a finger position of the first robot and a finger position of the second robot at each of operation periods, wherein
the position-corrected-command-value generating unit sets, in the first command values for learning, N detection values among detection values of the finger position of the first robot and N detection values among detection values of the finger position of the second robot.

6. The robot control apparatus according to claim 4, wherein the command correcting unit corrects the first command values for driving and the second command values for driving during the synchronous driving, the M first command values for driving and the M second command values for driving each include N second command values for learning, and the position-corrected-command-value generating unit adds up, concerning the respective second command values for learning, the second command values for learning and a representative value of latest correction amounts for a predetermined cycle by the command correcting unit for the second command values for learning to thereby calculate the first command values for learning.

7. The robot control apparatus according to claim 6, further comprising a command-value-for-learning selecting unit that selects command values for driving satisfying a setting condition concerning the acting force among the M first command values for driving and sets the selected command values for driving as the second command values for learning of the first robot.

8. The robot control apparatus according to claim 6, wherein the representative value is an average, a weighted average, a median, or a mode.

9. The robot control apparatus according to claim 1, further comprising a positional-relation-matrix-function generating unit that generates a positional relation matrix function for interpolating the N positional relation matrices, wherein the positional-relation-matrix interpolating unit generates a positional relation matrix for each of the first command values for driving on the basis of the positional relation matrix function.

10. The robot control apparatus according to claim 1, further comprising:

a speed-setting-value input unit that receives an input of a first speed setting value during the synchronous driving; and a positional-relation-matrix-function storing unit that stores in advance a positional relation matrix function for interpolating the N positional relation matrices at each second speed setting value different from the first speed setting value, wherein the positional-relation-matrix interpolating unit reads out, during the synchronous driving, the positional relation matrix function at the each second speed setting value stored by the positional-relation-matrix-function storing unit, corrects the read-out positional relation matrix function at the each speed setting value on the basis of the first speed setting value input to the speed-setting-value input unit, and generates a positional relation matrix at the each first speed setting value on the basis of the positional relation matrix function after the correction.

11. A robot control method for synchronously driving a first robot and a second robot different from the first robot, the robot control method comprising:

a positional-relation-matrix generating step for generating, on the basis of N first command values for learning per one robot, which are position-corrected command values for positioning the first robot and the second robot on tracks of the first robot and the second robot during the synchronous driving, concerning the respective N first command values for learning, positional relation matrices for defining a positional relation during the synchronous driving between a first command value for learning related to the first robot and a first command value for learning related to the second robot;

a first command-value output step for outputting a first command value for driving at each of M (M>N) operation periods, which is a command value for defining the track of the first robot;

a positional-relation-matrix interpolating step for interpolating the N positional relation matrices and generating a positional relation matrix at the each first command value for driving;

a second command-value generating step for causing the positional relation matrices corresponding to the M first command values for driving after the interpolation to act on the respective M first command values for driving and generating M second command values for driving, which are command values for defining the track of the second robot; and a synchronous driving step for driving the first robot on the basis of the first command values for driving and driving the second robot on the basis of the second command values for driving.

\* \* \* \* \*